US008509592B2

(12) United States Patent
Kusunoki

(10) Patent No.: US 8,509,592 B2
(45) Date of Patent: Aug. 13, 2013

(54) IMAGE DIFFERENCE DETECTION METHOD AND APPARATUS, SCENE CHANGE DETECTION METHOD AND APPARATUS, AND IMAGE DIFFERENCE VALUE DETECTION METHOD AND APPARATUS

(75) Inventor: Yoshiaki Kusunoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 12/595,222

(22) PCT Filed: May 16, 2008

(86) PCT No.: PCT/JP2008/059021
§ 371 (c)(1),
(2), (4) Date: Oct. 8, 2009

(87) PCT Pub. No.: WO2008/143167
PCT Pub. Date: Nov. 27, 2008

(65) Prior Publication Data
US 2010/0119210 A1    May 13, 2010

(30) Foreign Application Priority Data

May 21, 2007  (JP) ................................ 2007-134017
Aug. 31, 2007  (JP) ................................ 2007-225154

(51) Int. Cl.
*H04N 9/80*    (2006.01)
*H04N 9/70*    (2006.01)
(52) U.S. Cl.
USPC ............ 386/241; 386/239; 386/248; 386/300

(58) Field of Classification Search
USPC .................. 386/278–290, 300–313, 239–240
See application file for complete search history.

(56) References Cited

U.S. PATENT DOCUMENTS

| 6,339,617 | B1* | 1/2002 | Ueda .......................... 375/240.16 |
| 6,882,793 | B1* | 4/2005 | Fu et al. ......................... 386/241 |
| 2002/0036717 | A1* | 3/2002 | Abiko et al. ................... 348/700 |
| 2002/0136295 | A1* | 9/2002 | Sato .......................... 375/240.03 |
| 2006/0171599 | A1 | 8/2006 | Fukuhara et al. |
| 2007/0192782 | A1* | 8/2007 | Ramaswamy ..................... 725/9 |
| 2007/0195086 | A1* | 8/2007 | Yamazaki ...................... 345/422 |
| 2009/0116811 | A1* | 5/2009 | Kukreja et al. .................. 386/52 |

FOREIGN PATENT DOCUMENTS

| JP | 62-184585 A | 8/1987 |
| JP | 4-21078 A | 1/1992 |
| JP | 4-98377 A | 3/1992 |
| JP | 5-284369 A | 10/1993 |
| JP | 2002-64823 A | 2/2002 |
| JP | 2002-152770 A | 5/2002 |
| JP | 2004-259114 A | 9/2004 |

(Continued)

*Primary Examiner* — Hung Dang
(74) *Attorney, Agent, or Firm* — Birch, Stewart, Kolasch & Birch, LLP

(57) ABSTRACT

There are provided steps of extracting parts of two image data as areas for analysis (S702, S704) and an image difference detection step (S707) of detecting an image difference between the two images, based on a difference in image characteristic values of the regions for analysis; the regions for analysis in the two image data have identical size. If no image difference is detected, the region extraction steps may expand the regions for analysis (S707) by adding part or all of the image data that was not previously included in the regions for analysis (S704). Scene changes can be done rapidly in images and video.

18 Claims, 28 Drawing Sheets

(56) References Cited

FOREIGN PATENT DOCUMENTS

| | | |
|---|---|---|
| JP | 2004-282318 A | 10/2004 |
| JP | 2005-79675 A | 3/2005 |
| JP | 2006-202145 A | 8/2006 |
| WO | WO 2006/020560 A2 | 2/2006 |

\* cited by examiner

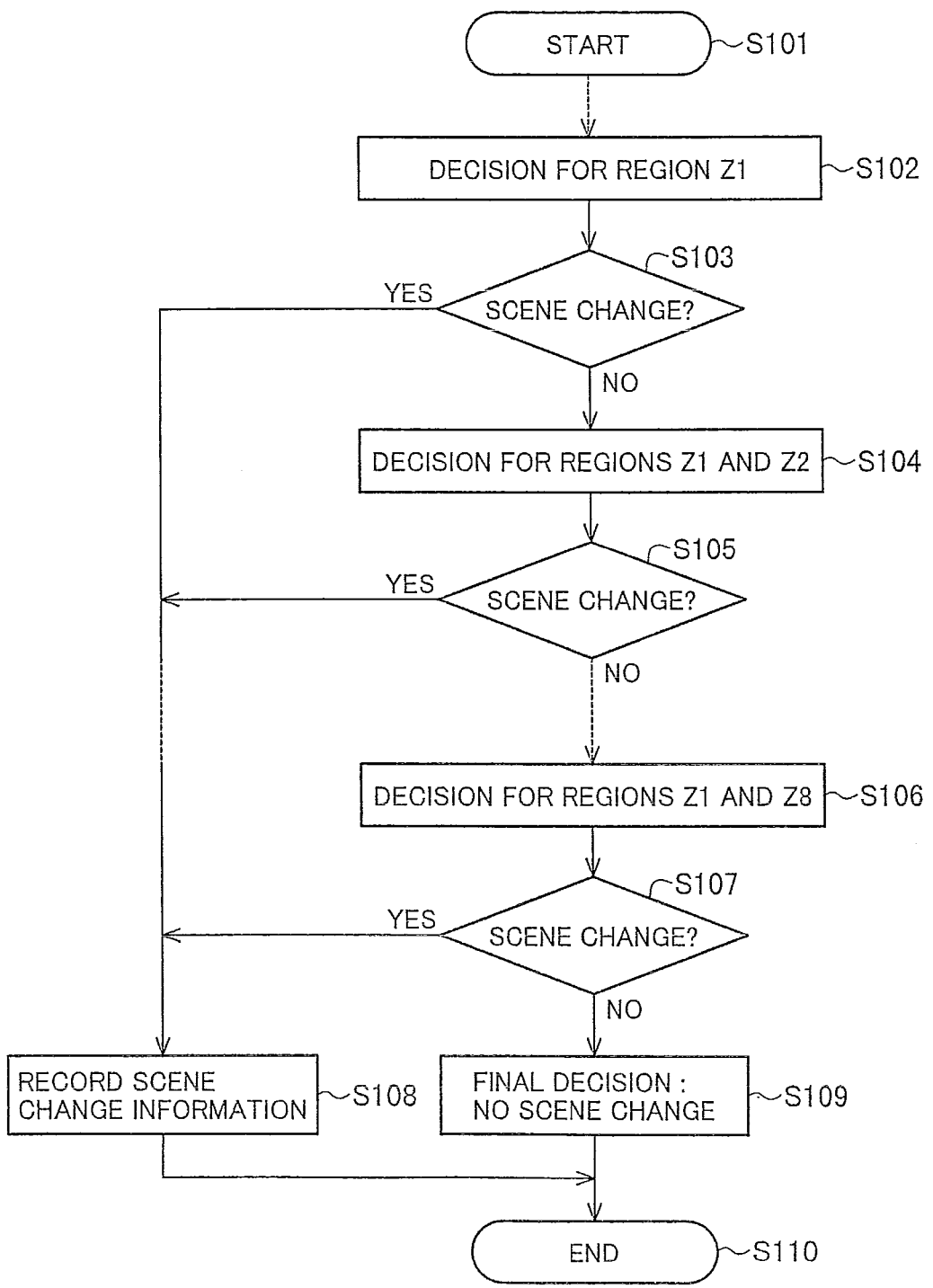

|  | 1ST FRAME | 2ND FRAME | 3RD FRAME | 4TH FRAME | 5TH FRAME | 6TH FRAME |
|---|---|---|---|---|---|---|
| ANALYSIS REGION IN PRECEDING FRAME | — | 80% | 30% | 60% | 40% | 70% |
| ANALYSIS REGION IN FOLLOWING FRAME | 80% | USE ONLY 30% | 60% | USE ONLY 40% | 70% | ... |

IMAGE DIFFERENCE DETECTION METHOD AND APPARATUS, SCENE CHANGE DETECTION METHOD AND APPARATUS, AND IMAGE DIFFERENCE VALUE DETECTION METHOD AND APPARATUS

FIELD OF THE INVENTION

The present invention relates to a scene change detection method and apparatus capable of detecting image differences or scene changes.

BACKGROUND ART

In conventional apparatus with recorded images or video, in order to detect significant differences between two arbitrary images or detect points of video scene changes, the images and video have had to be selected by manual input operations and the differences have had to be confirmed by human sight, which required much time and effort.

In order to solve these problems, methods for finding transitional scenes (referred to as scene changes below) in video have been proposed (see, for example, Patent Documents 1, 2, and 3). Patent Document 1 discloses a method in which the sum of the absolute values of differences in histogram levels between two images that are successive with each other temporally is calculated in a video signal pre-processing apparatus in a stage preceding an encoder that performs encoding, and if the calculated sum exceeds a given threshold value, it is decided that a scene change has occurred. Patent Document 2 discloses a method of determining scene changes by reading video data accumulated in storage media, such as HDDs. Patent Document 3 shows a method of dividing image data, in which scene changes are to be detected, into blocks and detecting scene changes in each block.

Patent Document 1: Japanese Patent Application Publication No. 2004-282318 (p. 7, FIG. 2)
Patent Document 2: Japanese Patent Application Publication No. 2002-064823 (p. 5, FIG. 1)
Patent Document 3: Japanese Patent Application Publication No. H5-284369 (p. 4, FIG. 1)

DISCLOSURE OF THE INVENTION

Problems to be Solved by the Invention

The method described in Patent Document 1, however, is problematic in that, because scene changes are detected by a video signal pre-processing apparatus disposed in a stage preceding an encoder, the method is inapplicable to a video recording apparatus equipped with an encoder chip set having a unitary structure, from the video decoder to the encoder, that does not output scene change extraction results externally. Even in an encoder chip set that outputs scene change extraction results, there is still a problem in that, because the scene change extraction results differ depending on the type of encoder chip set used, the video recording apparatus must be adjusted every time the type of encoder chip set is changed.

The method described in Patent Document 2 is impractical because scene changes are detected from video streams that have been compressed and recorded in an HDD, so processes that consume much time must be performed off-line after the completion of the recording process.

The method described in Patent Document 3 makes it possible to reduce the load per processing unit by dividing the scene change region into a plurality of blocks, but since processing must be executed on all the blocks to detect scene changes, this method cannot reduce the scene change processing time.

The present invention addresses the above problems of the prior art, with the object of providing a method and apparatus that can detect image differences or video scene changes quickly.

Means of Solution of the Problems

An image difference detection method that detects differences between two image data in the present invention includes:

a region extraction step of extracting parts of the two image data as data of regions for analysis; and an image difference detection step of detecting an image difference between the two images, based on a difference in image characteristic values in the regions for analysis extracted by the region extraction step; wherein the regions for analysis in the two image data have mutually identical sizes.

Effect of the Invention

Image differences and video scene changes can be detected quickly by the present invention.

BRIEF DESCRIPTION OF THE DRAWINGS

FIG. 3 is a flowchart illustrating a procedure associated with the region division shown in FIGS. 2(a) to 2(f).

EXPLANATION OF REFERENCE CHARACTERS

1 scene change detection apparatus, 2 scene change control unit, 3 video input unit, 4 switch, 5a, 5b frame memories, 6a, 6b region extraction units, 7 region control unit, 8a, 8b histogram generating units, 9 difference extraction unit, 10 scene change decision unit, 11 histogram buffers, 12 subregion histogram generating units, 13 cumulative difference value buffer, 14 encoded stream input unit, 15 decoders, 16 decoded video buffers, 17 threshold setting unit, 103 video input unit, 106a, 106b region extraction units, 107a, 107b region selection units, 108a, 108b read control units, 111a, 111b stream buffers, 112a, 112b decoders, 113 HDD, 118 threshold setting unit, 119 image selection unit.

BEST MODE FOR CARRYING OUT THE INVENTION

First Embodiment

Figure 1:
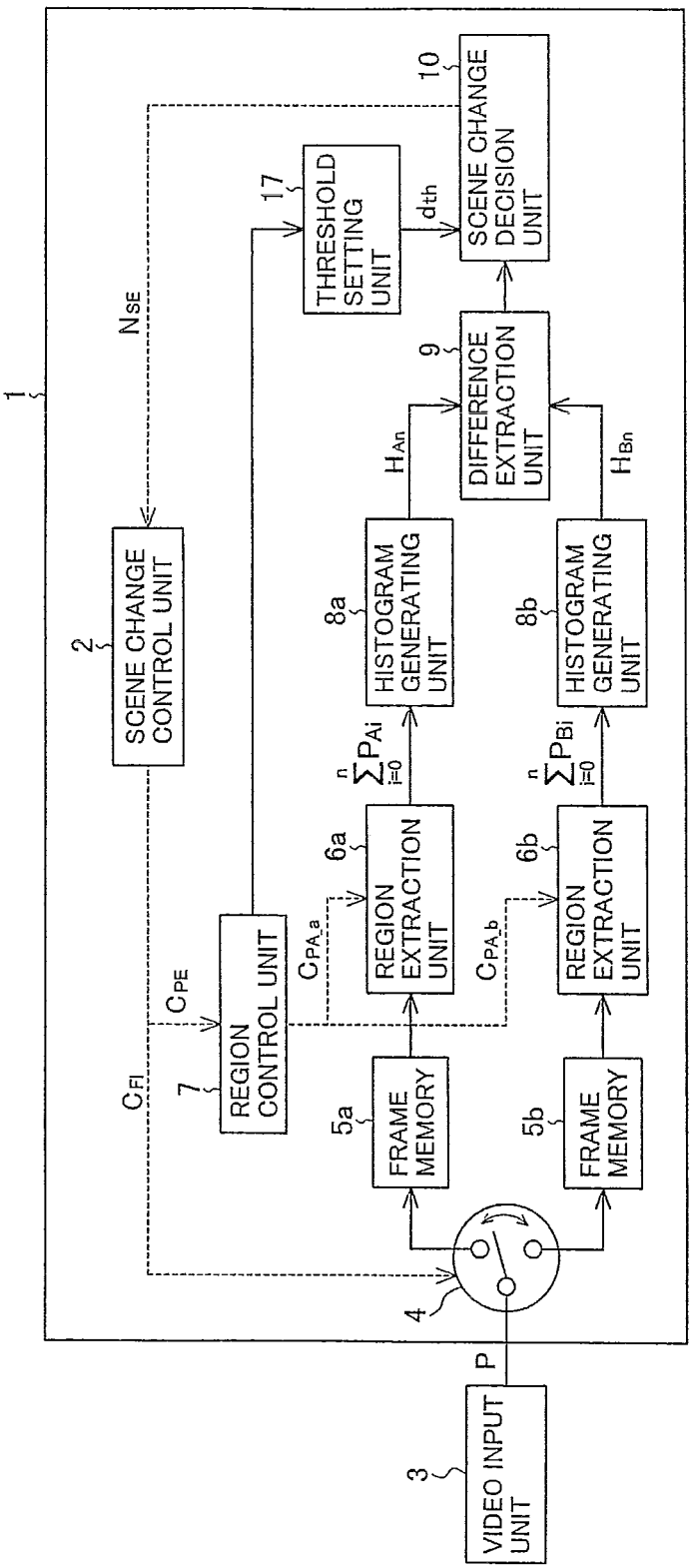
FIG. 1 is a block diagram illustrating the structure of the scene change detection apparatus in a first embodiment of the invention.

FIG. 1 is a block diagram illustrating the structure of the scene change detection apparatus 1 in the first embodiment of the invention. In the scene change detection apparatus 1 described in the first embodiment, video data P from a video data source, such as a hard disk, an optical disc, or a video signal line, are input through a video input unit 3.

The scene change detection apparatus 1 has a switch 4, first and second frame memories 5a, 5b, first and second region extraction units 6a, 6b, first and second histogram generating units 8a, 8b, a difference extraction unit 9, a scene change decision unit 10, a scene change control unit 2, and a region control unit 7.

The scene change control unit 2 starts and ends scene detection operations and detects results (scene change extraction results) $N_{SE}$ of decisions made by the scene change decision unit 10, saves the results in a memory (not shown), and controls the switch 4, which switches video data P from the video input unit 3 into frame memory 5a or frame memory 5b.

Each of the frame memories 5a, 5b has a data area for one screen, that is, one frame, of video data, and temporarily stores one frame of video data.

The switch 4 switches two video signal inputs, between which a scene change is to be detected, in units of one frame into frame memory 5a or frame memory 5b, respectively. The video data separated by the switch 4 and saved in frame memory 5a will be denoted $P_A$, and the video data saved in frame memory 5b will be denoted $P_B$.

The region extraction units 6a, 6b extract part of the video data of the single frames stored in frame memories 5a, 5b, respectively, as video data Pea, Peb of regions for analysis. 'Extracting the video data of a region' may be referred to below simply as 'extracting a region.'

The region control unit 7, on command from the scene change control unit 2, sets a region to be extracted by the region extraction units 6a and 6b in the entire region in one frame of the video data.

In this embodiment, the histogram generating units 8a and 8b generate histograms of the image data of the region extracted by the region extraction units 6a and 6b and the difference extraction unit 9 extracts the difference between these histograms, so that the region set by the region control unit 7 is the region for analysis and the scene change detection region.

The histogram generating units 8a, 8b generate histograms of the video data of the scene change detection subregions extracted by the region extraction units 6a, 6b.

When a histogram is generated, it suffices to generate a histogram for one or more components, of the video data: for example, a histogram of the luminance signal, a histogram of the color difference signals, or a histogram of a color signal (R, G, B), may be generated.

The region extraction units 6a, 6b and histogram generating units 8a, 8b are provided independently for video data $P_A$ and video data $P_B$, and carry out similar processing.

The difference extraction unit 9 calculates a difference (difference value) d between a histogram $H_A$ generated by histogram generating unit 8a and a histogram $H_B$ generated by histogram generating unit 8b by the following equation (1).

[Formula 1]

$$d = \frac{1}{2S_e} \sum_{k \in K} (H_A - H_B) \qquad (1)$$

$H_A$ and $H_B$ are histograms of the data Pea, Peb of the regions for analysis in video data $P_A$, $P_B$, and $S_e$ indicates the area of the video data Pea, Peb (area expressed in number of pixels). It will be assumed here that both video data Pea, Peb have the same area.

Furthermore, $$H_A = \{\text{Hist}_A(1), \text{Hist}_A(2), \ldots, \text{Hist}_A(k), \ldots, \text{Hist}_A(K)\} \qquad (2)$$

where $\text{Hist}_A(k)$ denotes the frequency (number of element values) of the kth element (class k) among video components 1 to K. It will be assumed here that k takes values from 1 to K (=255). Furthermore,

[Formula 2]

$$\sum_{k \in K} (H_A - H_B)$$

represents the sum of the absolute values of the differences between the elementary components in the parentheses: that is,

|Hist$_{Ai}$(1)−Hist$_{Bi}$(1)|+ ... +|Hist$_{Ai}$(k)−Hist$_{Bi}$(k)|+ ... +|Hist$_{Ai}$(K)−Hist$_{Bi}$(K)|.

The scene change decision unit 10 compares the difference value d calculated by the difference extraction unit 9 and a scene change decision value (hereinafter, 'scene change threshold value') d$_{th}$ supplied by the threshold setting unit 17, and when the difference value d exceeds the scene change threshold value d$_{th}$, that is, when the condition expressed by the following expression (3) is satisfied, the scene change decision unit 10 decides that a scene change has occurred.

$$d \geq d_{th} \quad (3)$$

Next, the operation of the scene change detection apparatus 1 will be described. When a command for starting the scene change detection operation is set in the scene change control unit 2, the video input unit 3 begins to supply video data. In accordance with a frame memory input control signal C$_{FI}$ from the scene change control unit 2, the switch 4 supplies the input video data P to frame memory 5a if scene change detection is being performed for an odd-numbered frame, and to frame memory 5b if scene change detection is being performed for an even-numbered frame. Alternatively, at scene change detection, a difference between frames separated from each other by several frames may be calculated, instead of a difference between adjacent frames (an odd-numbered frame and an even-numbered frame). For example, one frame may be extracted from every several frames, and scene changes may be detected based on the differences between the extracted frames. In this case, the image data of the frames that are sequentially extracted are supplied to and stored in the frame memories 5a or 5b alternately. For example, the ith frame to be extracted (after the start of operation) is supplied to one frame memory, frame memory 5a for example, if i is an odd number, and to the other frame memory (frame memory 5b), if i is an even number. In the detection of a scene change between two frames, the two frames need not be temporally close to each other; they may be temporally distant from each other. In this case, one frame may be set as a reference frame, and other frames may be compared to the reference frame one by one, to detect a scene change with respect to the reference frame.

Each of the frame memories 5a, 5b receives the image data for one frame distributed by the switch 4 and stores the data until it receives image data for the next comparison. The scene change control unit 2 sends a region extraction command C$_{PE}$ to the region control unit 7. The region control unit 7, upon receiving the region extraction command C$_{PE}$, decides the regions to be extracted by the region extraction units 6a, 6b.

It is assumed here that the image of one frame in the video data is divided into eight band-shaped regions (zones or slices) as shown in FIGS. 2(a) to 2(f), and the extraction region, that is, the scene change detection region, is enlarged in proportion to the number of trials n that have been made to determine whether a scene change has occurred or not (depending on which trial is currently being made). This operation will be further described later. In this case, the region control unit 7 determines the scene change detection region by selecting one or more regions (zones) from the eight regions (zones), and gives scene change detection region extraction commands (region control signals) C$_{PA\_a}$, and C$_{PA\_b}$ to the region extraction units 6a, 6b.

Upon receiving commands from the region control unit 7, the region extraction units 6a, 6b extract the subregions set by the region control unit 7, for example, the subregion video data of region Z1 in the odd-numbered frame and region Z1 in the even-numbered frame in FIGS. 2(a) to 2(f) (the subregion video data of the regions for scene change detection), from the single frames of video data stored in the frame memories 5a, 5b.

The region extraction units 6a, 6b are disposed in the paths of video data P$_A$ and P$_B$, respectively, and output subregion video data Pea, Peb. The histogram generating units 8a, 8b generate histograms h$_A$, h$_B$, respectively for the video data of the extracted region Z1 in the odd-numbered frame and the extracted region Z1 in the even-numbered frame.

In this embodiment, video data P$_A$ are divided into several regions and the number of regions increases with the number of trials n. In the example in FIGS. 2(a) to 2(f) and FIG. 3, when n=1 only region Z1 is the scene change detection region, when n=2 region Z1 and region Z2 are the scene change detection region, when n=3 region Z1, region Z2, and region Z3 are the scene change detection region, and so on; the scene change detection region is determined from the number of trials n, finally matching the entire video data region when n=N (=8).

Equation (2) above can be expressed here as follows, using the number of trials n as a variable.

[Formula 3]

$$Hist_A(k) = \sum_{i=1}^{N} hist_{Ai}(k) \quad (4)$$

That is, the histogram Hist$_A$(k) in the entire image region P$_A$ can be expressed as the sum of the unit region histograms hist$_{Ai}$(k) of N regions. If the subregion histogram h$_{An}$ in region Zn is $$h_{An} = \{hist_{An}(1), \ldots, hist_{An}(k), \ldots, hist_{An}(K)\} \quad (5)$$

then the cumulative histogram M$_{An}$ up to region Zn is expressed by the following equation (6).

[Formula 4]

$$M_{An} = \sum_{i=1}^{n} h_{Ai} = \left\{ \sum_{i=1}^{n} hist_{Ai}(1), \Lambda, \sum_{i=1}^{n} hist_{Ai}(k), \Lambda, \sum_{i=1}^{n} hist_{Ai}(K) \right\} \quad (6)$$

Using the cumulative histogram M$_{An}$ up to region Zn, the difference value d$_n$ up to region Zn can be expressed by the following equation (7).

[Formula 5]

$$d_n = \frac{1}{2\sum_{j=1}^{n} s_j} \sum_{k \in K} (M_{An} - M_{Bn}) \quad (7)$$

$$= \frac{1}{2\sum_{j=1}^{n} s_j} \left\{ \left| \sum_{i=1}^{n} hist_{Ai}(1) - \sum_{i=1}^{n} hist_{Bi}(1) \right| + \right.$$

$$\Lambda + \left| \sum_{i=1}^{n} hist_{Ai}(k) - \sum_{i=1}^{n} hist_{Bi}(k) \right| +$$

$$\left. \Lambda + \left| \sum_{i=1}^{n} hist_{Ai}(K) - \sum_{i=1}^{n} hist_{Bi}(K) \right| \right\}$$

In equation (7), $s_j$ indicates the number of pixels in the region that is extracted jth (j=1 to n) from the regions Z1 to Zn forming the scene change detection region in the nth trial,

[Formula 6]

$$S_a = \sum_{j=1}^{N} s_j$$

When all regions are extracted (n=N),

[Formula 7]

$$d = d_n = \frac{1}{2S_a} \sum_{k \in K} (H_A - H_B) \quad (8)$$

Next, FIGS. 2(a) to 2(f) and FIG. 3 will be used to describe a method of performing scene change detection in stages on the divided regions (subregions) of the two images. When scene change detection is started, first scene change detection is performed with one divided region: for example, region Z1. That is, a scene change decision is made for region Z1 (FIG. 2(a)) in the image $P_A$ of the odd-numbered frame and region Z1 (FIG. 2(b)) in the image $P_B$ of the even-numbered frame (S102).

Next, a scene change result decision is made in step S103, and if there is a scene change, the scene change detection process proceeds to scene change information recording S108 and then ends (S110).

Figure 2A:
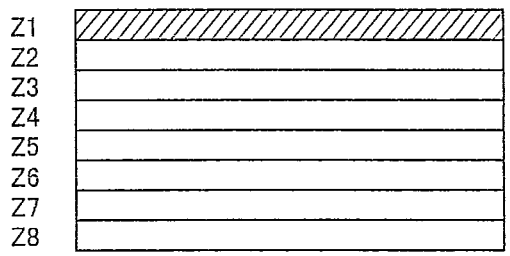
FIGS. 2(a) to 2(f) are drawings showing examples of region divisions in a scene change extraction apparatus in the first embodiment.
Figure 2B:
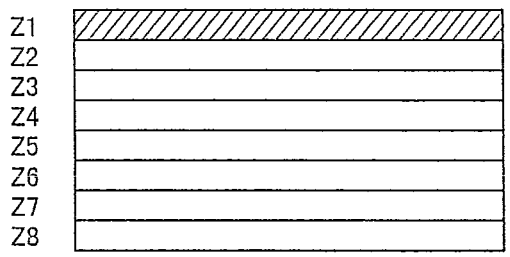
Figure 2C:
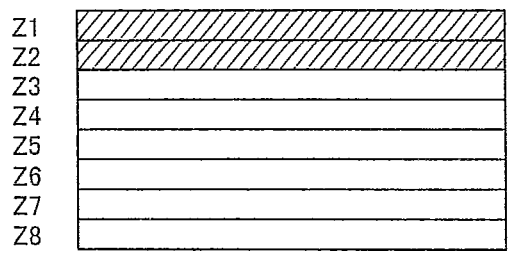
Figure 2D:
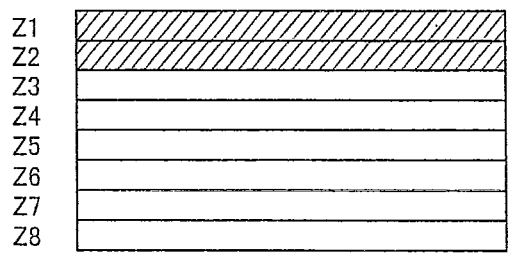

If there is not a scene change, region Z2 is added, and a scene change decision is made on the combination of regions Z1 and Z2 (FIGS. 2(c) and 2(d)).

A scene change result decision is made in step S105, and if there is a scene change, the process proceeds to scene change information recording S108 and then ends (S110).

When there is not a scene change, another region (for example region Z3) is added, and a scene change decision is made on these regions (the combination of regions Z1, Z2, and Z3). This process continues in the same way; if a scene change is not found, a new region is added, and a scene change decision is made on the enlarged group of regions including the added region.

Figure 2E:
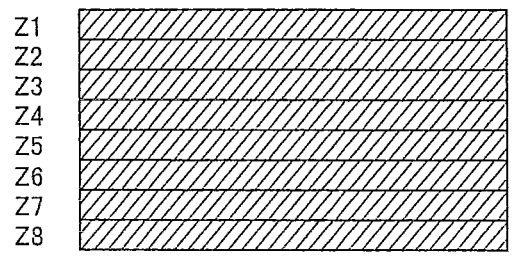
Figure 2F:
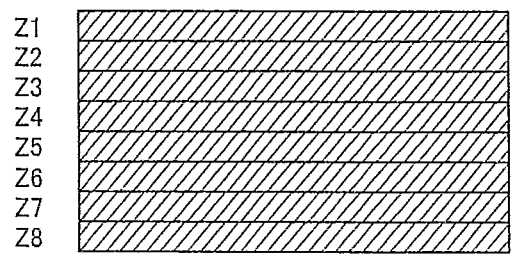

Finally, a scene change decision is made on the entire region (FIGS. 2(e) and 2(f)) (S106).

When a scene change is detected in step S107, the scene change extraction process proceeds to scene change information recording S108 and then ends; when there is no scene change, a final scene change decision result that there is no scene change is recorded (S109) and then the scene change extraction process ends (S110).

Thus a scene change decision is made on a region constituting part of the screen, and if a scene change is detected, the scene change processing ends; if a scene change is not detected, the region is enlarged and the scene change extraction process continues. The scene change extraction process can accordingly be completed more quickly because it is not necessary to process all regions in images $P_A$ and $P_B$.

The region control unit 7 controls the expansion of the region for analysis (region for detection of characteristics) by thus adding subregions one by one.

Figure 4:
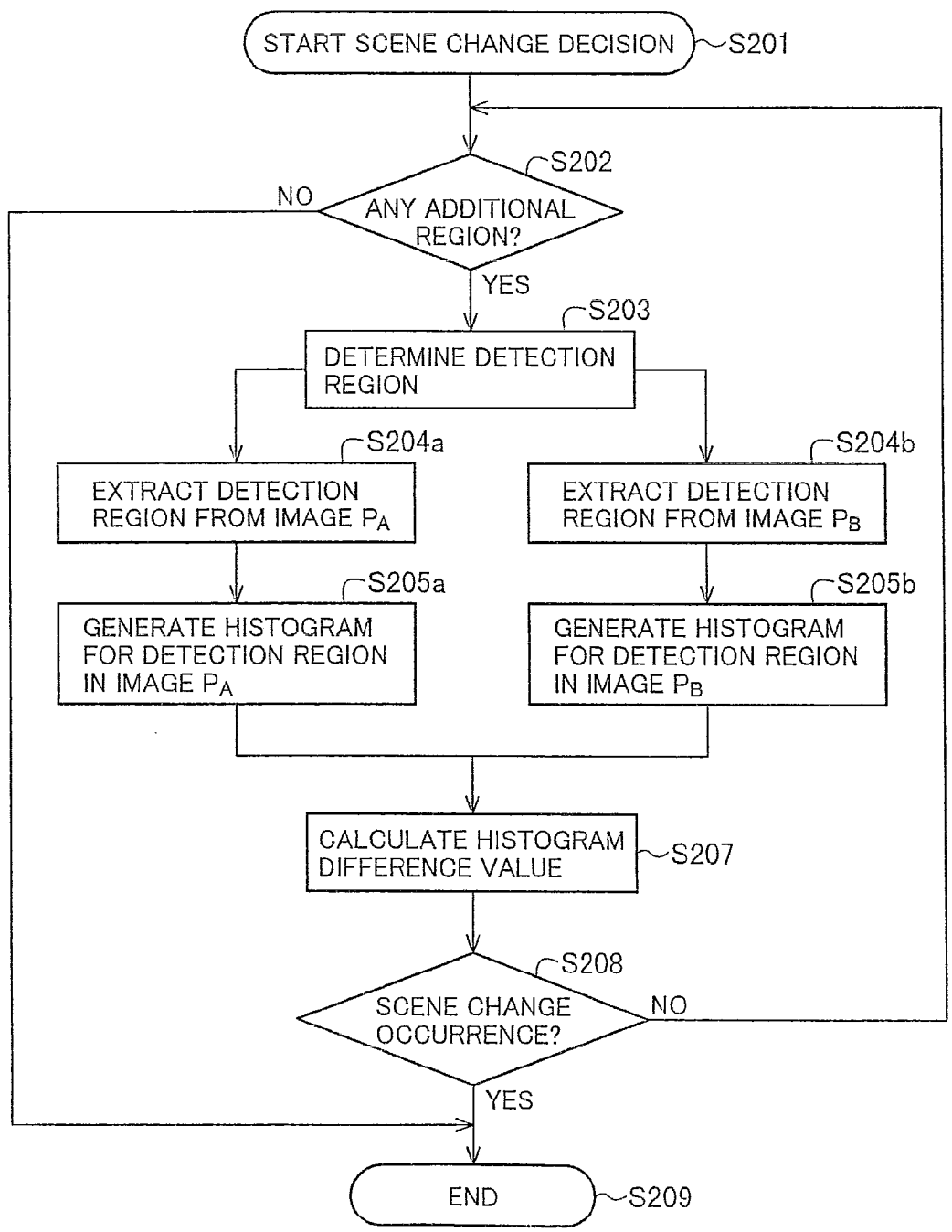
FIG. 4 is a flowchart illustrating the operation of the first embodiment.
Figure 5A:
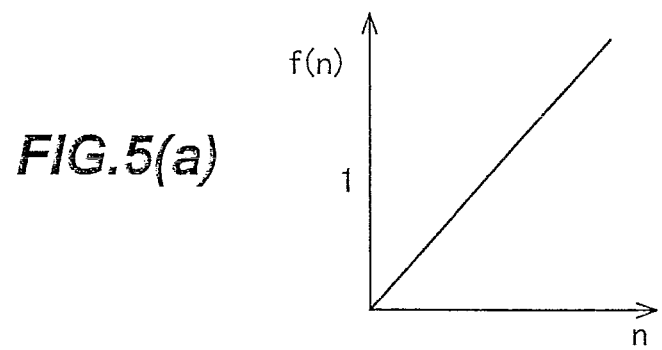
FIGS. 5(a) to 5(d) are drawings showing exemplary weighting functions used in a second embodiment, with the number of regions to be detected as a variable.
Figure 5B:
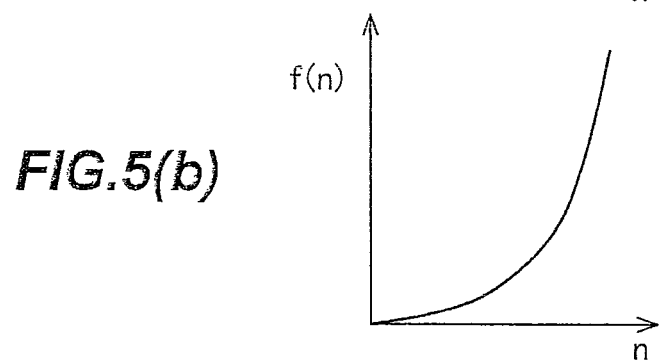
Figure 5C:
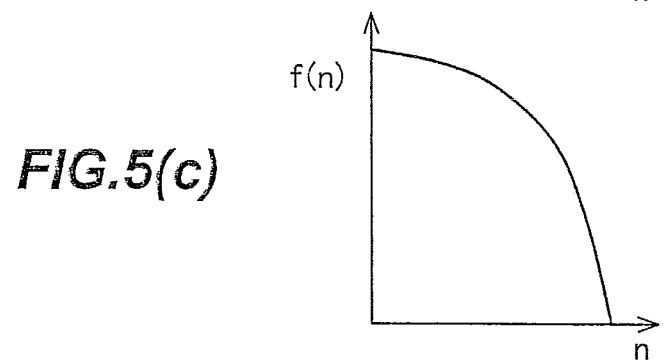
Figure 5D:
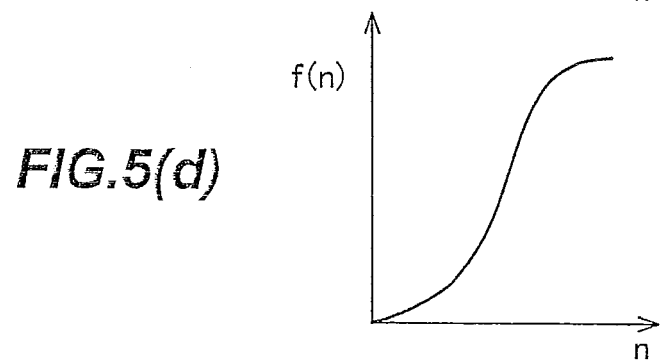
Figure 6A:
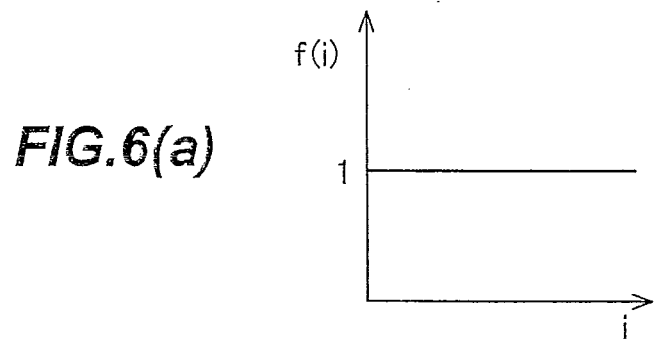
FIGS. 6(a) to 6(d) are drawings showing exemplary weighting functions used in the second embodiment, the weighting functions being set per region for detection.
Figure 6B:
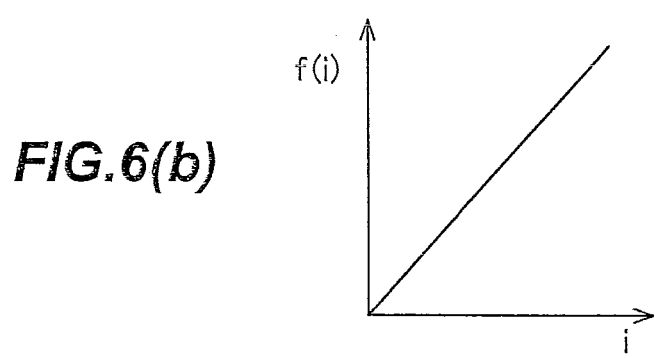
Figure 6C:
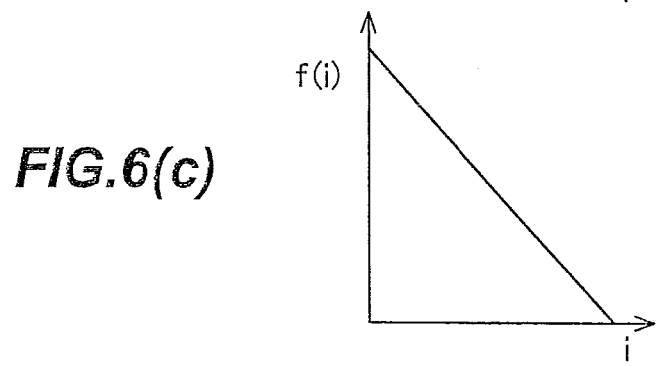
Figure 6D:
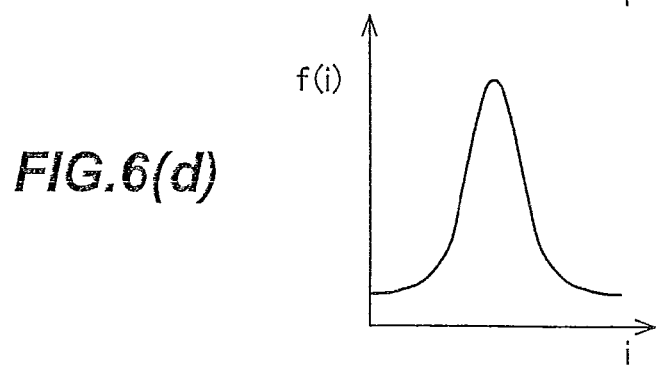

The above process will be described in detail below with reference to FIG. 4.

When the scene change extraction process is started (S201), after receiving a region extraction command $C_{PE}$ from the scene change control unit 2, the region control unit 7 decides whether or not there is a region to be added to the detection region (S202).

When there is a region to be added to the detection region, the region control unit 7 determines the scene change detection regions and commands the region extraction units 6a, 6b to extract the regions in images $P_A$ and $P_B$.

Upon receiving the region extraction commands, the region extraction units 6a, 6b extract scene change detection regions from the image data $P_A$ and $P_B$ in the frame memories 5a, 5b (S204a, S204b). Subregion video data of the scene change detection regions corresponding to the extracted regions are sent to the histogram generating units 8a, 8b, which generate histograms for each region (S205a, S205b). The difference extraction unit 9 calculates a difference value, which is a histogram difference value (S207), and if the difference value exceeds the scene change threshold value $d_{th}$, decides that a scene change has occurred (that a scene change has been detected); otherwise, it decides that a scene change has not occurred (a scene change has not been detected) (S208).

If a scene change has occurred (a scene change has been detected), the process ends.

When it is decided that no scene change has occurred (no scene change has been detected), a region on which a scene change is to be detected is added in step S202 and the above process is carried out again on the region including the newly added region. This process is repeated until a scene change is detected, or until the scene change detection region cannot be expanded by adding another divided region (zone) ('No' in step S202).

The above structure enables scene changes between two video images to be detected.

In addition, the time required for the scene change extraction process can be reduced because the scene change detection regions do not necessarily include the entire area of the two images that are compared. The load on the scene change detecting apparatus performing the processing can also be reduced.

In addition, among the divided regions, if sufficient difference is found in regions that become scene change extraction regions early, such as regions Z1 and Z2, to decide that a scene change has occurred, there is no need to analyze all the regions, so the scene change extraction can be completed rapidly.

In this embodiment, the maximum number of scene change detection regions is fixed at all regions of the image, but this number may be varied. In other words, the maximum number of scene change detection regions (the maximum limit) can be varied from scene to scene to control scene change detection sensitivity and speed. Scene change detection precision can thereby be improved by, for example, preventing scene change detection from reacting to the subtitles often displayed in the lower regions (regions near the bottom edge) of the images in movies and music programs.

When this scene change apparatus is incorporated into another system, and in other cases where the entire system is heavily loaded, by reducing the maximum number of detection regions or by excluding intermediate regions from the detection process, the scene change detection operation can be made to finish faster, and as a result, this can contribute to reducing the system load.

This scene change apparatus uses histograms to detect differences between images, but scene changes may be detected by methods other than histograms, such as methods using motion vectors, or by directly comparing the pixel values at particular positions in the images to be compared. That is, scene changes may be detected from differences between characteristic values other than histograms. Scene change detection based on differences between characteristic values other than histograms can be performed by, for example, replacing the histogram generating units $8a$, $8b$ in FIG. 1 with means for determining video characteristic values, having the difference extraction unit 9 determine the difference between the video characteristic values, obtaining video characteristic values instead of generating histograms in steps S205$a$ and S205$b$ in FIG. 4, and obtaining the difference between the video characteristic values instead of the histogram difference value in step S207.

This embodiment has been described in relation to differences between the images in different frames of data in one item of video data, that is, to scene changes, but it can also be applied to differences between arbitrary images from completely different video data. Moreover, it can be applied not only to video but also to a plurality of still pictures.

In such cases, the switch 4 does not separate odd-numbered frames and even-numbered frames from each other but supplies one of two frames to be compared to frame memory $5a$ and the other frame to frame memory $5b$.

Second Embodiment

The second embodiment has the same structure as the first embodiment, shown in FIG. 1, but obtains a difference value $d_n$ weighted with a weight that is changed according to the number n of divided regions (zones) included in the scene change detection region. The calculation by which the difference value $d_n$, is obtained is expressed by, for example, the following equation (9).

[Formula 8]

$$d_n = \frac{f(s_n)}{2\sum_{j=1}^{n} s_j} \sum_{k \in K} (M_{An} - M_{Bn}) \quad (9)$$

In equation (9), $M_{An}$ and $M_{Bn}$ are the cumulative histograms of images $P_A$ and $P_B$ over n trials (up until the nth trial) and $f(s_n)$ is a weighting function that varies with the number of trials n and the number of pixels s in the scene change detection region.

Exemplary weighting functions are shown in FIGS. 5($a$) to 5($d$). The number of trails n is shown on the horizontal axis in FIGS. 5($a$) to 5($d$), and the weight $f(s_n)$ is shown on the vertical axis.

In the weighting function shown in FIG. 5($a$), the weight does not vary with the change in the region but has a constant value of 1, yielding the same result as shown in the first embodiment.

The weighting function shown in FIG. 5($b$) is an example in which the weight is proportional to the region, so that a scene change tends to become easier to detect as the region over which it is detected is enlarged. Conversely, the scene change detection sensitivity can be lowered when the detection region is small. This has the effect of suppressing misdetection of scene changes, such as when images $P_A$ and $P_B$, taken as entire images, should not be decided to show a scene change, but despite that, when scene change detection is carried out on part of the images, region Z1 in the first embodiment for example, a scene change is decided to have taken place.

The weighting function shown in FIG. 5($c$) is an example in which the weight increases as the region decreases, so that quick detection is possible at a stage when the detection region is small. Setting this type of weighting function enables scene change detection to be completed faster, because a scene change can be detected even when the detection region is small.

The weighting function shown in FIG. 5($d$) is an example that enhances the detection sensitivity for a particular region; this example is configured to raise the sensitivity when the detection region is about half of the entire region. If the selected regions are added on in steps from the upper edge of the image, as in the first embodiment, the sensitivity can be raised around the center.

When the region is divided up and scene change detection is performed in stages, this configuration makes it possible to suppress misdetection due to use of only part of the image. In other words, the precision of scene change detection can be improved.

Also, it is possible to focus the decision on a particular region by changing the weighting function characteristic.

The difference value $d_n$ in nth trial (the difference value using the histograms up to region Zn) can be calculated by multiplying the differences (($\text{hist}_{Ai}(k) - \text{hist}_{Bi}(k)$)) between the frequencies (element values) of classes in the histogram for each region by the weighting function $f(i)$ of the region, and calculating the total of the products, as shown in the following equation (10), in which case the dependence on the region Zi (the region (zone) in the position expressed by the quantity i) can be increased.

[Formula 9]

$$d_n = \frac{f(s_n)}{2\sum_{j=1}^{n} s_j} \times \left\{ \left| \sum_{i=1}^{n} f(i)(\text{hist}_{Ai}(1) - \text{hist}_{Bi}(1)) \right| + \right. \quad (10)$$

$$\ldots + \left| \sum_{i=1}^{n} f(i)(\text{hist}_{Ai}(k) - \text{hist}_{Bi}(k)) \right| +$$

$$\left. \ldots + \left| \sum_{i=1}^{n} f(i)(\text{hist}_{Ai}(K) - \text{hist}_{Bi}(K)) \right| \right\}$$

FIGS. 6($a$) to 6($d$) show examples of the weighting function $f(i)$.

The quantity i is the region number as shown in FIGS. 2($a$) to 2($f$): for example, if there are eight regions and they are designated Zi (i=1, 2, ..., 8), the region number will be 1, 2, ... sequentially from the top, depending on the position of the region.

The scene change detection precision can be controlled dynamically by dynamically changing the weighting function. For example, the characteristic of the function can be changed depending on the video genre or content and scene change detection can be carried out as suitable for the character of the video: for sports, the weighting function shown in FIG. 5(b) can be used to bias the decision toward the entire image; for a drama, the weighting function shown in FIG. 5(d) can be used to focus the decision on the central part of the image. In this embodiment, an example is shown in which the weighting function changes depending on the image region or size; alternatively, a weighting function tailored to the video component (histogram class) k may be used.

Although an example in which the characteristic of the weighting function was changed was shown in this embodiment, the threshold may be changed according to the number of scene change trials or the scene change detection region.

In this case, the threshold $d_{th}$ output from the threshold setting unit 17 is determined (set or changed) depending on the output from the region control unit 7, the $d_{th}$ thus determined is supplied to the scene change decision unit 10, and the scene change decision unit 10 makes scene change decisions by using the threshold supplied from the threshold setting unit 17.

Third Embodiment

Figure 7:
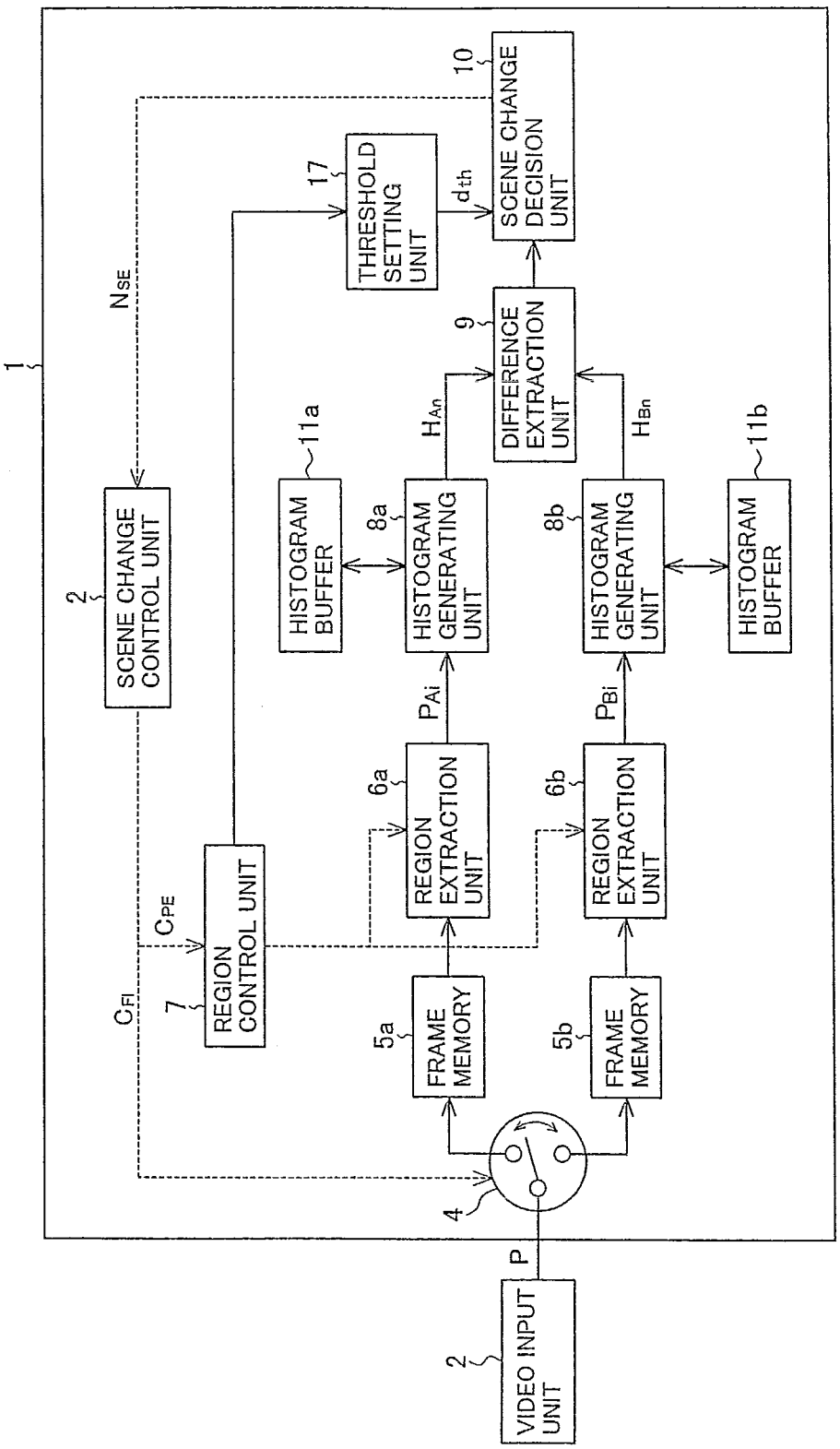
FIG. 7 is a block diagram illustrating the structure of the scene change extraction apparatus in a third embodiment.
Figure 8:
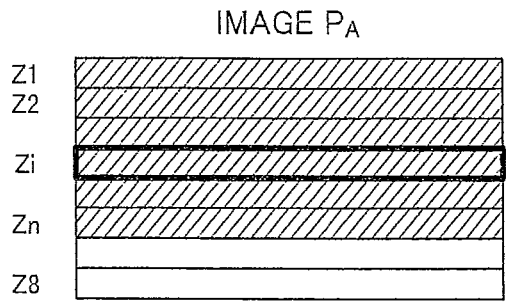
FIG. 8 is a diagram of a divided region, for explaining a histogram corresponding to the divided region.

FIG. 7 is a block diagram illustrating the structure of the scene change detection apparatus 1 in a third embodiment of the invention. The difference between this embodiment and the first embodiment is that first and second histogram buffers 11a, 11b are added in FIG. 7. A cumulative value of the histograms of the regions Z1-Zn on which scene change detection is carried out from the start of scene change detection in image data $P_A$ and $P_B$ until the nth trial,

[Formula 10]

$$M_{An} = \sum_{i=1}^{n} h_{Ai} \qquad (11)$$
$$= \left\{ \sum_{i=1}^{n} \left( hist_{Ai}(1), \Lambda, \sum_{i=1}^{n} hist_{Ai}(k), \Lambda, \sum_{i=1}^{n} hist_{Ai}(K) \right) \right\}$$

is stored in the histogram buffers 11a, 11b. The symbol $h_{Ai}$ in equation (11) is the partial histogram in region Zi shown in FIG. 8. If image $P_A$ is divided into N parts (eight parts), the total histogram $H_A$ can be expressed as

[Formula 11]

$$H_{An} = M_{AN} = \sum_{i=1}^{n} h_{Ai} \qquad (12)$$

In the first embodiment, when the number of trials was n, the image data of the entire scene change detection region

[Formula 12]

$$\sum_{i=1}^{n} P_{Ai}$$

were sent from the region extraction units 6a, 6b to the histogram generating units 8a, 8b, while in the third embodiment, only (the image data of) the region that is newly added as a scene change detection region is sent to the histogram generating units 8a, 8b. Histogram generating unit 8a generates a histogram $h_{An}$ for the subregion represented by $P_{An}$. The histogram buffers 11a, 11b store the sum of the histograms up to the region Z(n−1) one region before (the cumulative histogram up to (n−1)th trial)

[Formula 13]

$$M_{A(n-1)} = \sum_{i=1}^{n} h_{Ai} \qquad (13)$$

so the cumulative histogram up to region Zn (the cumulative histogram up to the current trial (the nth trial)) can be calculated by the following equation (14).

$$M_{An} = M_{A(n-1)} + h_{An} \qquad (14)$$

As described above, the cumulative histogram $M_{An}$ up to the nth trial can be obtained by calculating the histogram $h_{An}$ for each scene change detection region (Zn), and using the cumulative histograms $M_{A(n-1)}$ up to the (n−1)th trial that are stored in the histogram buffers 11a, 11b.

Figure 9:
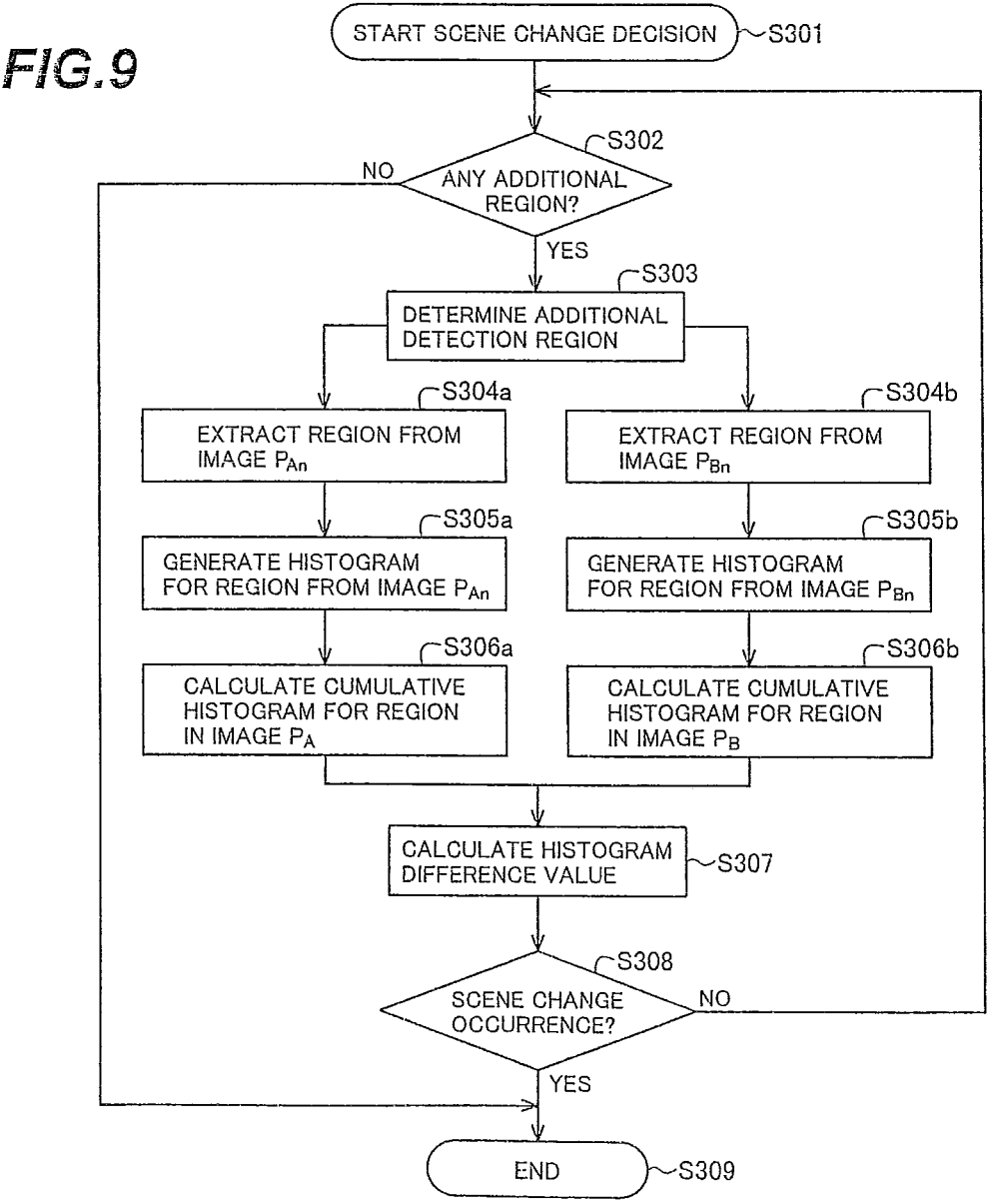
FIG. 9 is a flowchart illustrating the operation of the third embodiment.

Next, this will be explained with reference to the flowchart in FIG. 9. At the start of scene change extraction (S301), the region control unit 7, upon receiving a region extraction command $C_{PE}$ from the scene change control unit 2, determines whether or not there is a region to be added as a detection region (S302).

Upon receiving region extraction commands, the region extraction units 6a, 6b determine the regions (added detection regions) $P_{An}$, $P_{Bn}$ that have newly become scene change detection regions from the images $P_A$, $P_B$ in the frame memories 5a, 5b (S303), and extract the regions $P_{An}$, $P_{Bn}$ respectively (S304a, S304b). The image data of the extracted detection subregions, that is, subregion data of the scene change detection regions, are sent to the histogram generating units 8a, 8b, histograms $h_{An}$, $h_{Bn}$ are generated for subregions $P_{An}$ and $P_{Bn}$ (S305a, S305b), and by adding them to the cumulative histograms $M_A(n-1)$ and $M_B(n-1)$ up to the (n−1)th trial, which are stored in the histogram buffers 11a, 11b, the $M_{An}$ and $M_{Bn}$ up to the nth trial can be obtained. The difference value $d_n$ up to region Zn is then obtained from the calculation expressed by the following equation (15) (S307).

[Formula 14]

$$d_n = \frac{1}{2\sum_{j=1}^{n} s_j} \sum_{k \in K} ((M_{A(n-1)} + h_{An}) - (M_{B(n-1)} + h_{Bn})) \qquad (15)$$

In equation (15), $M_A(n-1)$, $M_B(n-1)$ are cumulative histograms up to the (n−1)th trial that are calculated by the processing in step S306a, S306b for calculating cumulative histograms, and stored in the histogram buffers 11a, 11b.

When the condition $$d_n \geq d_{th} \qquad (3)$$

is satisfied in step S308, it is decided that a scene change has occurred and the process ends (S309). If a scene change does not occur, the process returns to step S302.

The above operation is repeated until it is decided that a scene change has occurred, or until it is decided in step S302 that there is no region to add.

The above structure enables scene changes to be detected between two images.

In addition, the time required for the scene change extraction process can be reduced because the scene change detection regions do not necessarily include the entire area of the two images that are compared. The load on the scene change detecting apparatus performing the processing can also be reduced.

In addition, among the divided regions, if sufficient difference is found in regions that become scene change extraction regions early, such as regions Z1 and Z2, to decide that a scene change has occurred, the scene change detection process can be discontinued (terminated) without analyzing all the regions, so the scene change detection process can be completed rapidly.

Conversely, the scene change detection process can be discontinued (terminated) if, as a result of scene change detection for a particular region, the difference value is so small that even if scene change detection were to be carried out on the remaining regions, it would not be decided that there was a scene change, and as above, the scene change detection process can be completed rapidly.

Furthermore, the region is divided up and partial histograms are obtained for each divided region, so the histograms can be generated from a small search area (region for analysis) in the image.

When a histogram of a region including a newly added region is obtained, the histograms already generated for regions other than the new region are used again and the histogram of the new region is added on, so it is not necessary to re-execute the calculation process for obtaining the histograms of the regions for which histograms have already been obtained; processing time can be saved, memory necessary for the processing can be saved, and CPU resources (not shown) can be saved.

In this embodiment, the occurrence of a scene change is decided after adding histograms of new regions (histograms of regions newly added in the current trial) to the histograms accumulated so far (cumulative histograms up to previous trial), but when it can be decided from the values of the cumulative histograms up to previous trial that whatever values the histograms of the newly added regions might take, they would not produce a scene change, the histogram addition process can be carried out without carrying out the scene change decision process. The process can thereby by carried out rapidly.

In the third embodiment, as stated in the first embodiment, scene changes may be detected from differences between image characteristic values other than histograms. Scene change detection based on differences between characteristic values other than histograms can be performed by, for example, replacing the histogram generating units 8a, 8b in FIG. 7 with means for determining video characteristic values, replacing the histogram buffers 11a, 11b with a buffer for storing cumulative video characteristic values, having the difference extraction unit 9 determine the difference between the cumulative video characteristic values, obtaining video characteristic values instead of generating histograms in steps S305a and S305b in FIG. 9, obtaining cumulative video characteristic values instead of cumulative histograms in steps S306a and S306b, and obtaining the difference between the cumulative video characteristic values instead of the cumulative histogram difference values in step S307.

Fourth Embodiment

Figure 10:
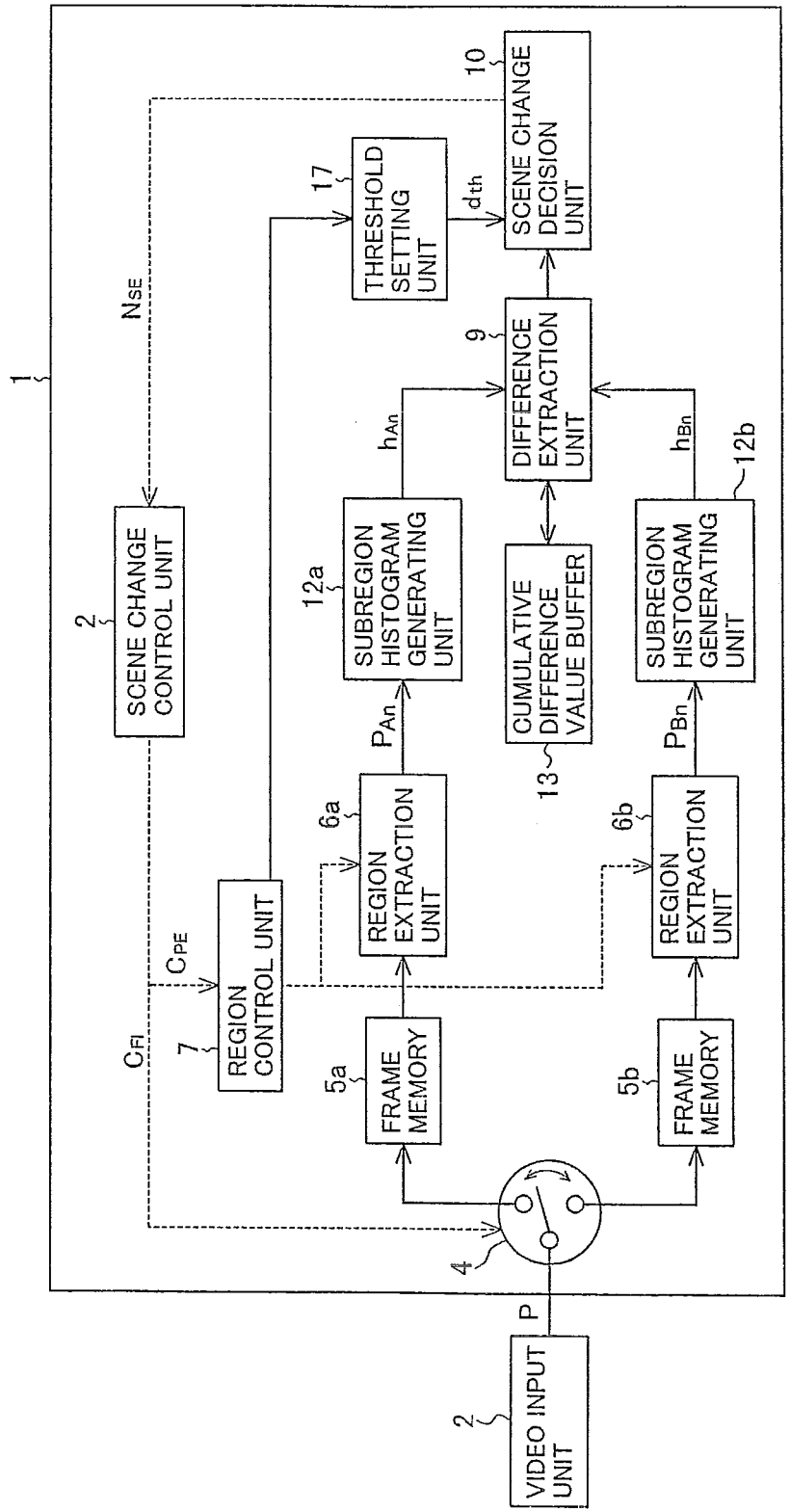
FIG. 10 is a block diagram illustrating the structure of the scene change extraction apparatus in a fourth embodiment.

FIG. 10 shows the structure of the fourth embodiment. The fourth embodiment eliminates the histogram generating units 8a, 8b and histogram buffers 11a, 11b in FIG. 7 from the third embodiment, and adds subregion histogram generating units 12a, 12b and a cumulative difference value buffer 13. The video data of the scene change detection region corresponding to the subregions $P_{An}$, $P_{Bn}$ that have been newly extracted are sent to the subregion histogram generating units 12a, 12b, which generate subregion histograms $h_{An}$, $h_{Bn}$ for each region, as in the third embodiment. The difference extraction unit 9 calculates the subregion difference value $e_n$ in the region Zn from the subregion histograms $h_{An}$, $h_{Bn}$. The cumulative difference value buffer 13 stores the cumulative difference value $e(n-1)$ up to the (n−1)th trial and the difference extraction unit 9 calculates the cumulative difference value $e(n)$ from the difference value $e_n$ of the new subregion. The cumulative difference value $e(n)$ thus calculated is stored in the cumulative difference value buffer 13 and used for scene change detection in the next region $Z(n+1)$. The scene change decision unit 10 uses the cumulative difference value $e(n)$ calculated in the difference extraction unit 9 to decide whether or not there is a scene change.

Figure 11:
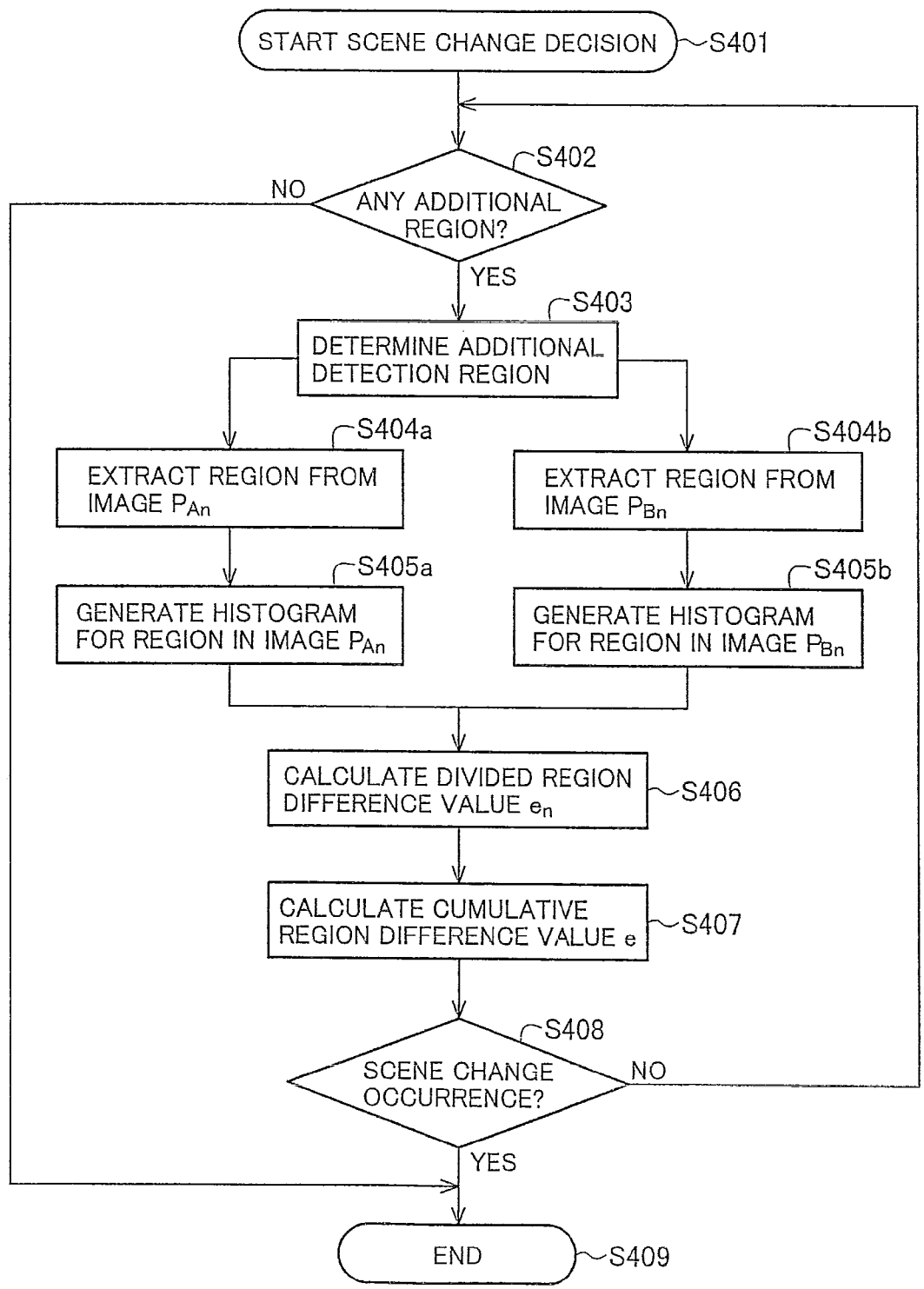
FIG. 11 is a flowchart illustrating the operation of the fourth embodiment.

Next, the operation of this embodiment will be described with reference to the flowchart shown in FIG. 11. When the scene change extraction process is started (S401), the region control unit 7, upon receiving a region extraction command $C_{PE}$ from the scene change control unit 2, determines whether or not there is a region to be added as a detection region (S402). The region extraction units 6a, 6b, upon receiving region extraction commands, determine regions $P_{An}$, $P_{Bn}$ that have newly become scene change detection regions from the images $P_A$, $P_B$ in the frame memories 5a, 5b (S403), and extract these regions $P_{An}$, $P_{Bn}$ (S404a, S404b). The partial video data of the scene change detection regions corresponding to the extracted scene change detection subregions are sent to the subregion histogram generating units 12a, 12b, which generate histograms $h_{An}$, $h_{Bn}$ for the subregions $P_{An}$, $P_{Bn}$ (S405a, S405b). Next, by use of the histograms $h_{An}$, $h_{Bn}$ for the extracted subregions $P_{An}$, $P_{Bn}$ a subregion difference value $e_n$ is obtained as in the following equation (S406).

[Formula 15]

$$e_n = \frac{1}{2s_n} \sum_{k \in K} (h_{An} - h_{Bn}) \qquad (16)$$

$$= \frac{1}{2s_n} \{|hist_{An}(1) - hist_{Bn}(1)| + \Lambda + |hist_{An}(k) - hist_{Bn}(k)| + \Lambda + |hist_{An}(K) - hist_{Bn}(K)|\}$$

Based on the subregion difference value $e_n$ thus calculated and the cumulative difference value $e(n-1)$ up to the (n−1)th trial stored in the cumulative difference value buffer 13, the cumulative difference value $e(n)$ is calculated as follows:

[Formula 16]

$$e(n) = \frac{1}{n}\{(e(n-1) + e_n)\} \qquad (17)$$

It is assumed here that the divided regions have the same size, that is, $s = s_t$, in which case:

[Formula 17]

$$e_n = \frac{1}{n}\sum_{i=1}^{n} e_i \quad (18)$$

$$= \frac{1}{n}\sum_{i=1}^{n} \frac{1}{2s_i} \sum_{k \in K}(h_{Ai} - h_{Bi})$$

$$= \frac{1}{n}\sum_{i=1}^{n} \frac{1}{2s_i}\{|hist_{Ai}(1) - hist_{Bi}(1)| + \Lambda + |hist_{Ai}(k) - hist_{Bi}(k)| + \Lambda + |hist_{Ai}(K) - hist_{Bi}(K)|\}$$

$$= \frac{1}{2ns}\sum_{i=1}^{n}\{|hist_{Ai}(1) - hist_{Bi}(1)| + \Lambda + |hist_{Ai}(k) - hist_{Bi}(k)| + \Lambda + |hist_{Ai}(K) - hist_{Bi}(K)|\}$$

In the above equation, $s_i$ represents the area (number of pixels) in the subregion (zone) in the position expressed by the quantity i. When regions are extracted (added) in order of position, the jth extracted zone and zone in the position expressed by the quantity i are same, and i=j.

Similarly, for the difference value $d_n$ calculated for regions Z1 to Zn, if it is assumed that the divided regions have same size, i.e., $s=s_i$, then equation (7) can be expressed as:

[Formula 18]

$$d_n = \frac{1}{2\sum_{j=1}^{n} s_j} \sum_{k \in K}(M_{An} - M_{Bn}) \quad (19)$$

$$= \frac{1}{2s_n}\left\{\left|\sum_{i=1}^{n} hist_{ai}(1) - \sum_{i=1}^{n} hist_{Bi}(1)\right| + \Lambda + \left|\sum_{i=1}^{n} hist_{Ai}(k) - \sum_{i=1}^{n} hist_{Bi}(k)\right| + \Lambda + \left|\sum_{i=1}^{n} hist_{Ai}(K) - \sum_{i=1}^{n} hist_{Bi}(K)\right|\right\}$$

If equations (18) and (19) are expressed in terms of the histogram elements (classes) k, equation (18) can be expressed as

[Formula 19]

$$\sum_{i=1}^{n}\{|hist_{Ai}(k) - hist_{Bi}(k)|\} \quad (20)$$

and equation (19) can be expressed as

[Formula 20]

$$\left|\sum_{i=1}^{n} hist_{Ai}(k) - \sum_{i=1}^{n} hist_{Bi}(k)\right| \quad (21)$$

That is, equations (18) and (20) calculate a difference value for each region, while equations (19) and (21) calculate the average difference value for the entire region.

This shows that use of the subregion difference value $e_n$ and the cumulative difference value e(n), which is the sum of the subregion difference values, enables the difference between images to be detected on a region basis.

In the above configuration, the difference value is calculated in units of the divided subregions, so even though scene change decisions are made for gradually expanded regions, the difference value need not be recalculated for regions for which the difference value has already been calculated; scene change decisions can therefore be made rapidly.

Also, when scene change decisions are made by dividing the regions, the values that are held are scalar difference values that require less memory then when vector values such as histograms are recorded. The calculations can also be speeded up because of the small memory usage.

In the fourth embodiment, as stated in the first embodiment, scene changes may be detected from differences between image characteristic values other than histograms. Scene change detection based on difference between characteristic values other than histograms can be performed by, for example, replacing the subregion histogram generating units 12a, 12b in FIG. 10 with means for determining subregion video characteristic values, having the difference extraction unit 9 determine the cumulative difference value between the video characteristic values, and having the cumulative difference value buffer 13 store the cumulative difference value between the video characteristic values, obtaining video characteristic values instead of generating histograms in steps S405a and S405b in FIG. 11, obtaining the difference value between video characteristic values of divided regions instead of obtaining the difference value between histograms of divided regions in step s406, and obtaining the difference between cumulative video characteristic values instead of obtaining the cumulative histogram difference value in step S407.

Fifth Embodiment

The fifth embodiment has basically the same structure as in FIG. 1, described in the first embodiment, but is differentiated in that the video signal input is an encoded video stream, decoding is performed by dividing the image regions of the encoded stream, and among the divided image regions, histogram generation is executed on decoded image data corresponding to one or a plurality of divided regions the decoding of which has been completed.

Figure 12:
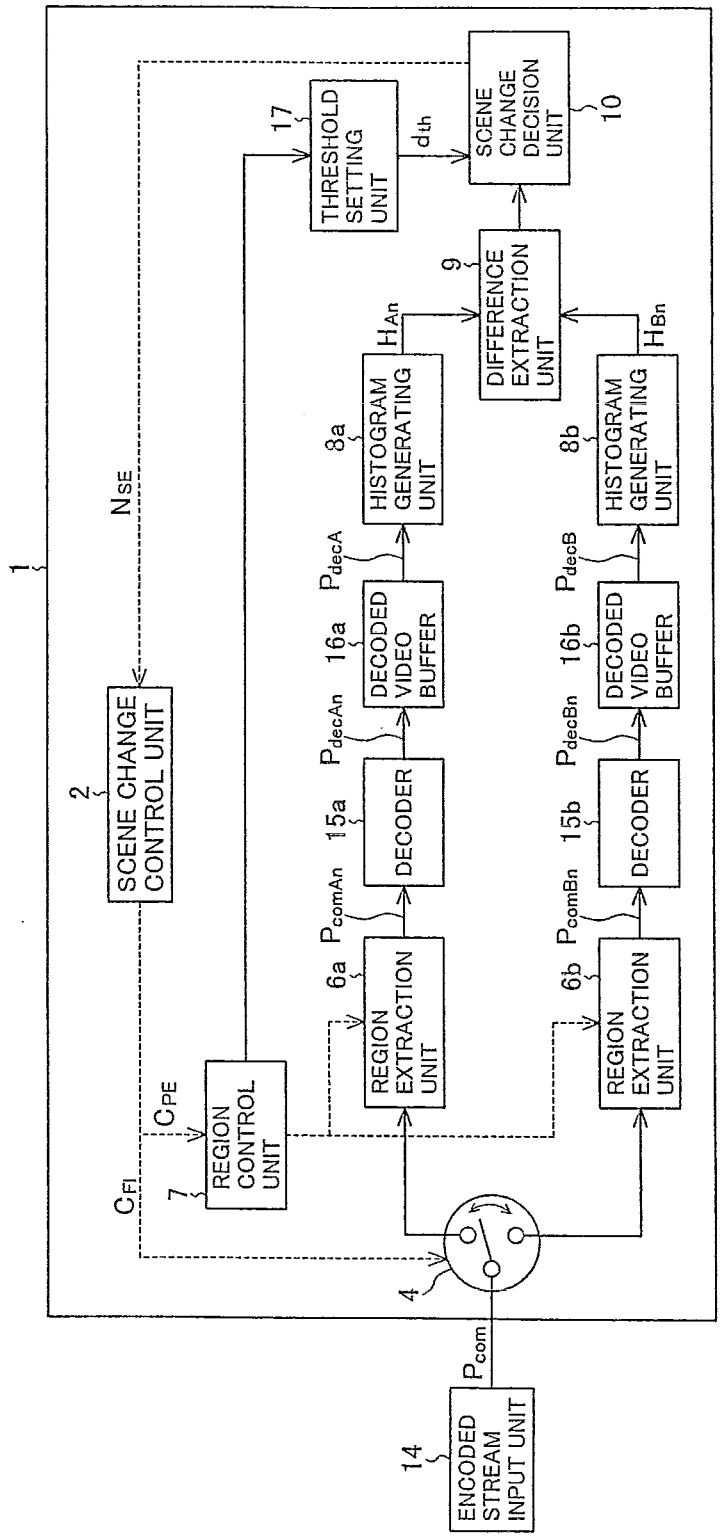
FIG. 12 is a block diagram illustrating the structure of the scene change extraction apparatus in a fifth embodiment.

FIG. 12 shows the structure of the fifth embodiment. The overall structure in FIG. 12 is the same as in FIG. 1, but the frame memories 5a, 5b in FIG. 1 are missing, and decoders 15a, 15b and decoded video buffers 16a, 16b are provided in their place.

The scene change control unit 2 in FIG. 12 distributes the encoded stream input from the encoded stream input unit 14 a frame at a time to region extraction unit 6a or region extraction unit 6b by means of the switch 4. Responding to a region extraction command $C_{PE}$ from the scene change control unit 2, the region control unit 7 commands region extraction unit 6a to extract a scene change detection region. From the encoded stream, region extraction unit 6a extracts the encoded data forming the subimage data of the scene change detection region. The extracted encoded data $P_{comAn}$ and $P_{comBn}$ are sent to the decoders 15a, 15b and decoded, one subregion at a time. The decoded image data $P_{decAn}$ and $P_{decBn}$ are sent to the decoded data buffers 16a, 16b, and the decoded image data are placed in their positions in the video stream before it was encoded. With a video compression method such as MPEG-2, for example, that performs slice-at-a-time encoding, decoding is carried out a slice at a time as shown in FIGS. 2(a) to 2(f). Video data that have been decoded in slices corresponding to the number of scene change trials are thus placed in the decoded video buffers 16a, 16b. The histogram generating units 8a, 8b read the decoded image data $P_{decAn}$ and $P_{decBn}$, which are image data of one or a plurality of subregions the decoding of which has already been completed, from the decoded video data buffers 16a, 16b, and generate histograms. The generated histograms $H_{An}$ and $H_{Bn}$ are sent to the difference extraction unit 9, and a difference value d calculated in the difference extraction unit 9 is compared in the scene change decision unit 10 with a scene change threshold value $d_{th}$ set by the threshold setting unit 17 to detect scene changes.

Figure 13:
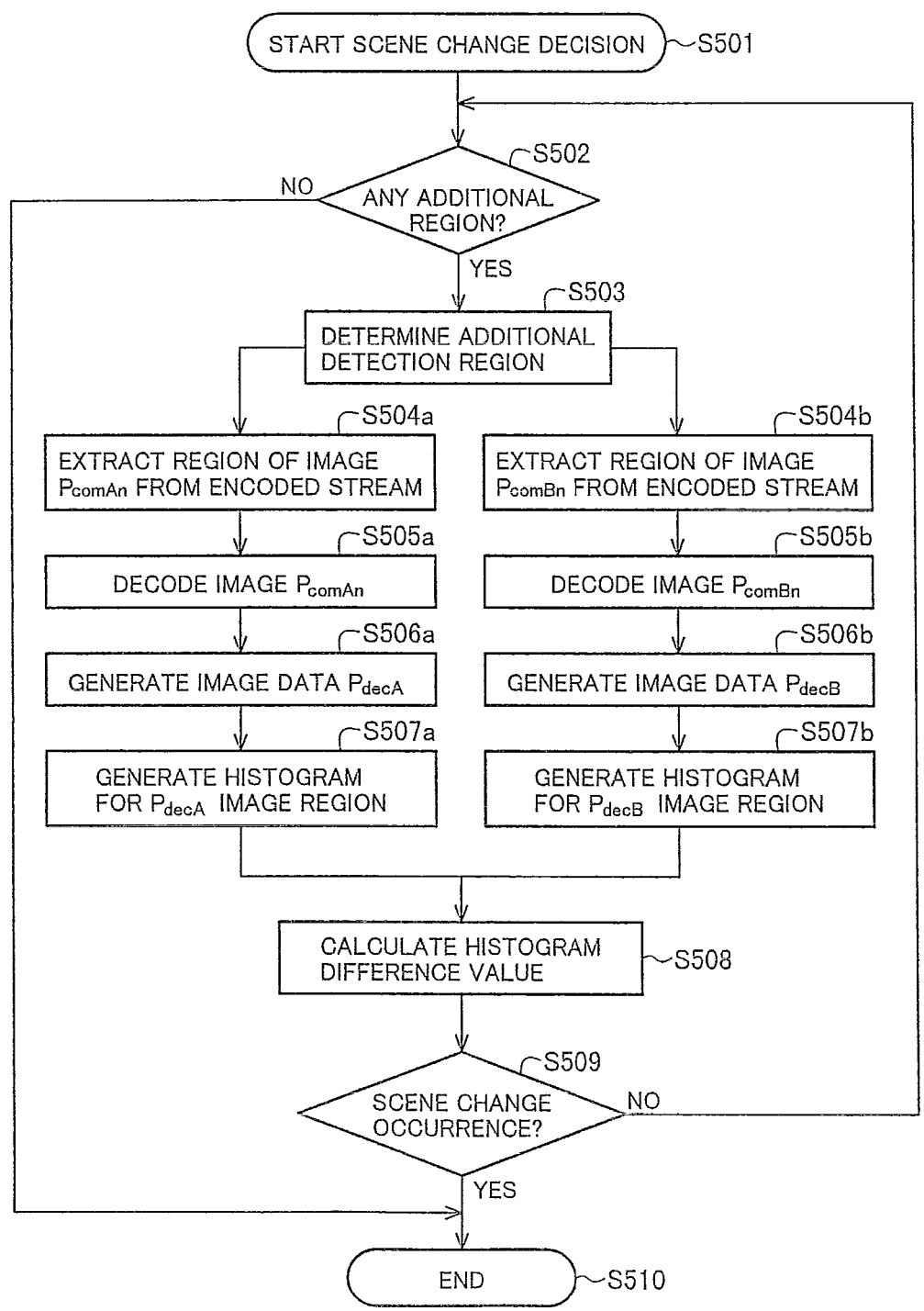
FIG. 13 is a flowchart illustrating the operation of the fifth embodiment.

Next the operation of the fifth embodiment will be explained with reference to the flowchart shown in FIG. 13. When the scene change detection process is started (S501), upon receiving a region extraction command $C_{PE}$ from the scene change control unit 2, the region control unit 7 decides whether or not there is a region to be added next as a detection region (S502). Upon receiving commands to extract regions, the region extraction units 6a, 6b determine the region $P_{An}$ and region $P_{Bn}$ that have newly become scene change detection regions from the frames of the encoded stream (S503), and read the encoded data $P_{comAn}$ and $P_{comBn}$ corresponding to those regions (S504a, S504b). The decoders 15a, 15b decode the encoded data $P_{comAn}$ and $P_{comBn}$ (S505a, S505b), generate decoded images, and store them in the decoded video buffers 16a, 16b.

The histogram generating units 8a, 8b generate histograms from image data $P_{decA}$, $P_{decB}$ that are decoded and stored in decoded video buffers 16a, 16b, respectively (S507a, S507b), the difference extraction unit 9 calculates the difference value of the histograms (S508), and the scene change decision unit 10 compares the difference value with threshold value $d_{th}$ to detect a scene change (S509). If it is decided that a scene change has occurred, scene change detection ends (S510); if a scene change is not detected, an additional region is set (S502), the scene change detection region is expanded, and scene change execution continues.

When it is decided in step S502 that there is no region to be added to the scene change detection region, the process ends (S510).

Adoption of the above structure can lighten the processing load because the time-consuming decoding process is not carried out on regions not tested for scene changes.

Furthermore, the decoding process, which becomes a problem when scene change decisions are made from the encoded stream, can be markedly reduced because it is not necessary to carry out scene change decisions on entire images by changing the threshold of the scene change decision dynamically depending on the scene change detection region as in second embodiment.

In the fifth embodiment, as stated in the first embodiment, scene changes may be detected from differences in image characteristic values other than histograms. Scene change detection based on differences between characteristic values other than histograms can be performed by, for example, replacing the histogram generating units 8a, 8b in FIG. 12 with means for determining video characteristic values, having the difference extraction unit 9 determine the difference between the video characteristic values, obtaining video characteristic values instead of generating histograms in steps S507a and S507b in FIG. 13, and obtaining the difference value of the video characteristic values instead of the histogram difference value in step S508.

Sixth Embodiment

The sixth embodiment is distinguished from the fifth embodiment by carrying out histogram generation on divided regions, and holding the histograms of the divided regions in histogram buffers. Consequently, if a histogram has already been generated for a divided region, it is not necessary to generate a histogram for it again.

Figure 14:
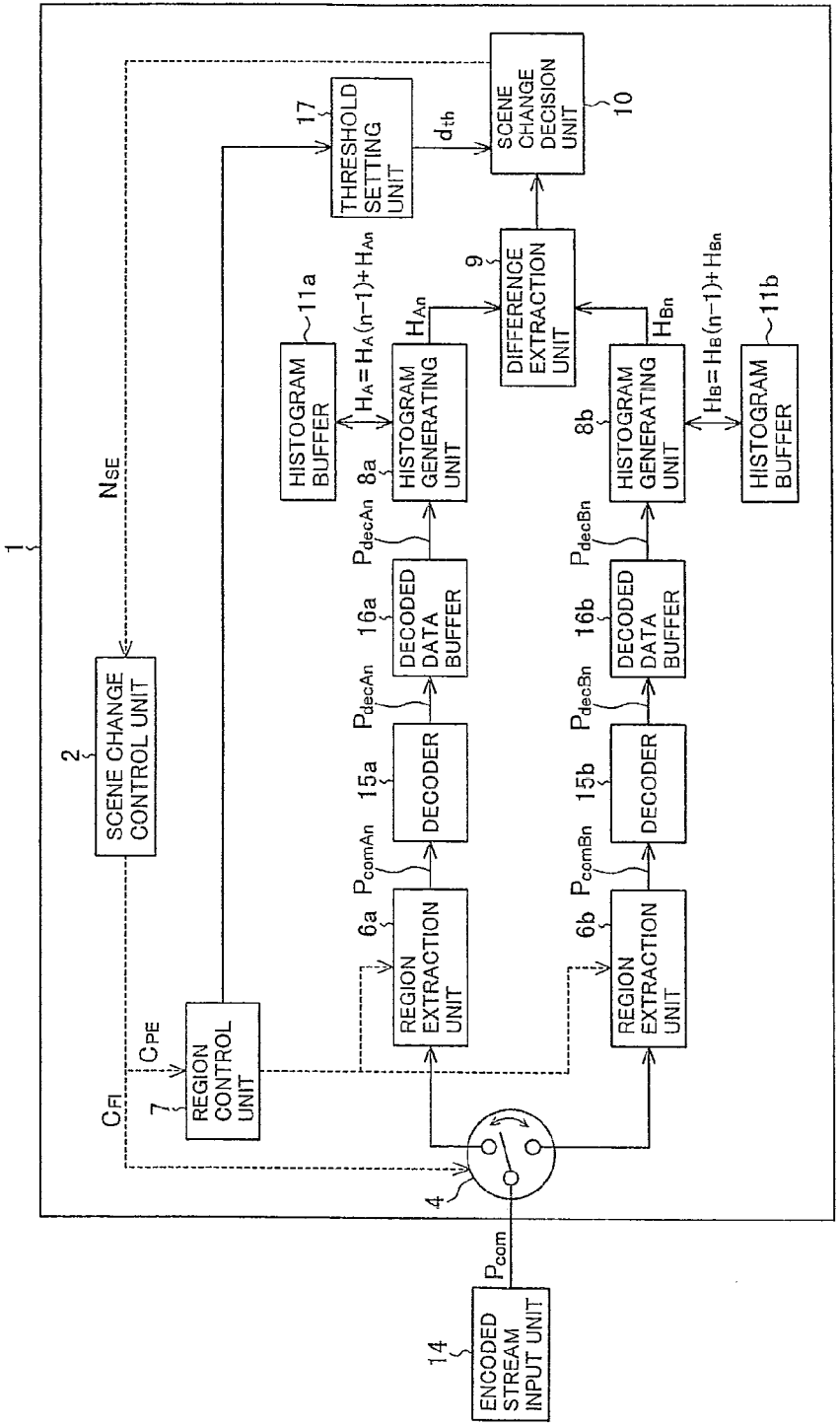
FIG. 14 is a block diagram illustrating the structure of the scene change extraction apparatus in a sixth embodiment.

The scene change control unit 2 in FIG. 14 distributes the encoded stream input from the encoded stream input unit 14 one frame at a time to region extraction unit 6a or region extraction unit 6b by means of the switch 4. Responding to a region extraction command $C_{PE}$ from the scene change control unit 2, the region control unit 7 commands region extraction unit 6a to extract the scene change detection region. From the encoded stream, the region extraction unit 6a extracts the encoded data forming the video data of the scene change detection subregion. The extracted encoded data $P_{comAn}$, $P_{comBn}$ are sent to decoders 15a, 15b and decoded, one subregion at a time. The decoded image data $P_{decAn}$ and $P_{decBn}$ are sent to the decoded data buffers 16a, 16b, and placed in their positions in the video image before it was encoded. With a video compression method such as MPEG-2, for example, that performs slice-at-a-time encoding, decoding is carried out a slice at a time as shown in FIGS. 2(a) to 2(f). The decoded video buffers 16a, 16b hold the decoded image data of the slices that were decoded this time. The histogram generating units 8a, 8b read the decoded image data $P_{decAn}$ and $P_{decBn}$ which are image data decoded corresponding to subregions, from the decoded video data buffers 16a, 16b, and generate histograms for these subregions. The generated histograms $H_{An}$ and $H_{Bn}$ are added to the histograms $H_{A(n-1)}$ and $H_{B(n-1)}$ generated before to generate histograms $H_A$ and $H_B$ corresponding to the regions already under consideration. The difference extraction unit 9 calculates the difference value between the histograms $H_A$ and $H_B$, and the scene change decision unit 10 compares this difference value with the scene change threshold $d_{th}$ to a detect scene change.

Figure 15:
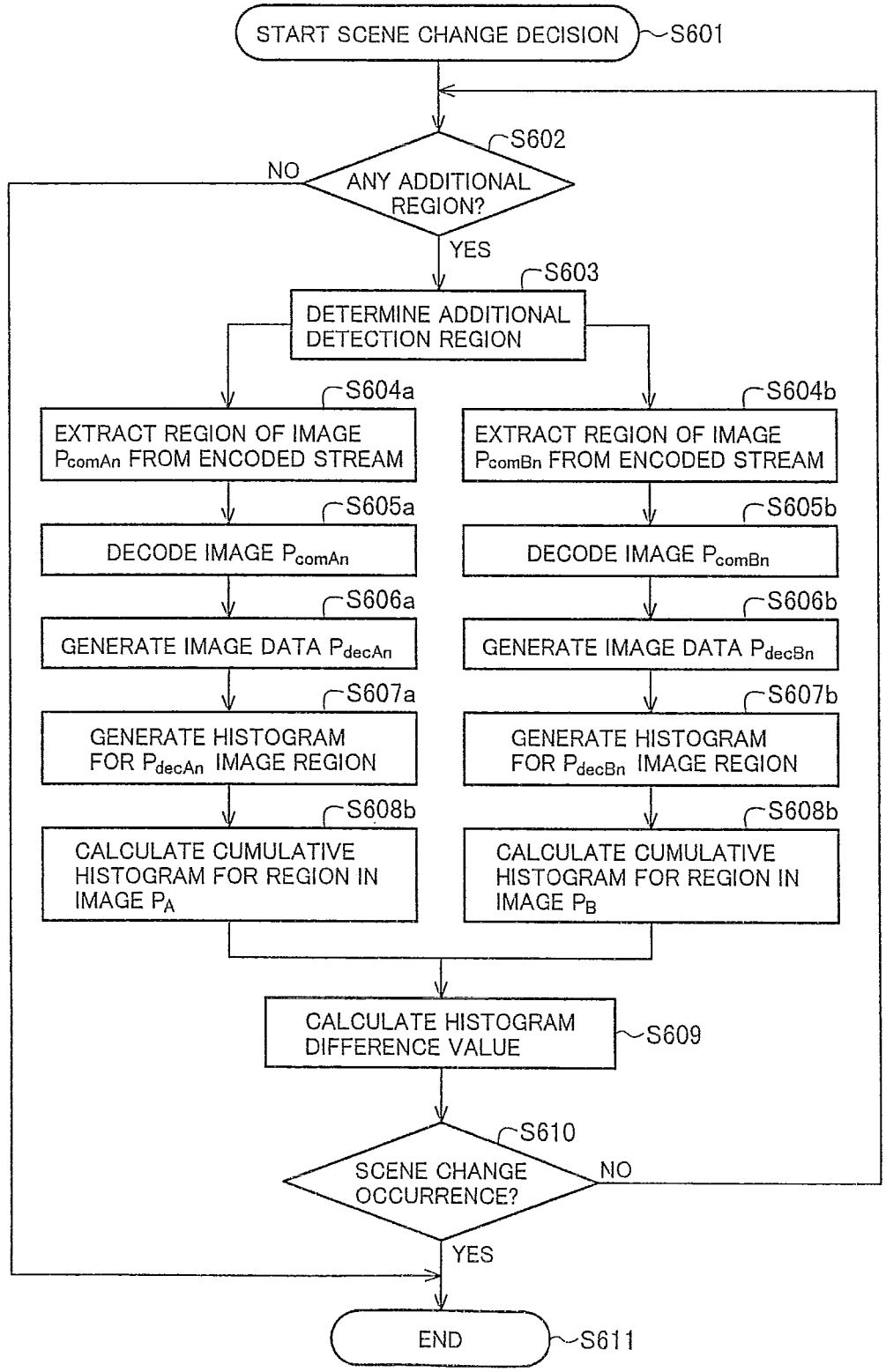
FIG. 15 is a flowchart illustrating the operation of the sixth embodiment.

Next the operation of the sixth embodiment will be explained with reference to the flowchart shown in FIG. 15. When the scene change extraction process is started (S601), upon receiving a region extraction command $C_{PE}$ from the scene change control unit 2, the region control unit 7 decides whether or not there is a region to be added next as a detection region (S602). Upon receiving region extraction commands, the region extraction units 6a, 6b determine the region $P_{An}$ and region $P_{Bn}$ that have newly become scene change detection regions from the frames of the encoded stream (S603), and read the encoded data $P_{comAn}$ and $P_{comBn}$ corresponding to those regions (S604a, S604b). The decoders 15a, 15b decode the encoded data $P_{comAn}$ and $P_{comBn}$ (S605a, S605b), and generate decoded image data $P_{decAn}$ and $P_{decBn}$ in the decoded video buffers 16a, 16b (S606a, S606b). The histogram generating units 8a, 8b generate histograms corresponding to the subregions from the decoded subregion image data $P_{decAn}$ and $P_{decBn}$ held in the decoded video buffers 16a, 16b (S606a, S606b), and obtain cumulative histograms $H_A$ and $H_B$ of the regions considered in the trials so far from the cumulative histograms $H_A(n-1)$, $H_B(n-1)$ up to the preceding trial, which were obtained by the histogram generating units 8a, 8b up to the preceding trial and held in the histogram buffers 11a, 11b (S608a, S608b). The difference extraction unit 9 calculates the difference value of histograms $H_A$ and $H_B$ (S609) and the scene change decision unit 10 compares the difference value with the threshold $d_{th}$ to decide whether there is a scene change (S610). If it is decided that a scene change has occurred, scene change detection ends (S611); if a scene change is not detected, an additional region is set (S602), the scene change detection region is expanded, and scene change execution continues. If it is decided in 5602 that there is no region to be added to the scene change detection region, the process ends (S611).

Adoption of the above structure can lighten the processing load because the time-consuming decoding process is not carried out on regions not tested for scene changes.

Also, since decoding is carried out on the divided regions, little buffer space is needed for the decoding of the MPEG stream and for storing the decoded data. Because decoded image data have a large data size, eliminating the need to buffer decoded image data has the particular effect of reducing the total system cost. Another effect of reducing the amount of data is that that the number of memory accesses and the bandwidth requirement for memory access can be reduced.

In the sixth embodiment, as stated in the first embodiment, scene changes may be detected from differences in image characteristic values other than histograms. Scene change detection based on differences between characteristic values other than histograms can be performed by, for example, replacing the histogram generating units 8a, 8b in FIG. 14 with means for determining video characteristic values, replacing the histogram buffers 11a, 11b with buffers for storing cumulative video characteristic values, having the difference extraction unit 9 determine the difference between the video characteristic values, obtaining video characteristic values instead of generating histograms at steps S607a, S607b in FIG. 15, obtaining cumulative image characteristic values instead of calculating cumulative histograms at steps S608a, S608b, and obtaining a difference between cumulative video characteristic values instead of the cumulative histogram difference value in step S609.

Although the second embodiment has been described as a variation of the first embodiment, the feature of altering the threshold used in the scene change decision step to determine the occurrence of scene changes according to the area or position of the region for analysis, as described in the second embodiment, can be incorporated in the structure of the third to sixth embodiments.

The second to sixth embodiments can also be used to detect differences, other than scene changes, between two images, as stated in the first embodiment.

Seventh Embodiment

Figure 16:
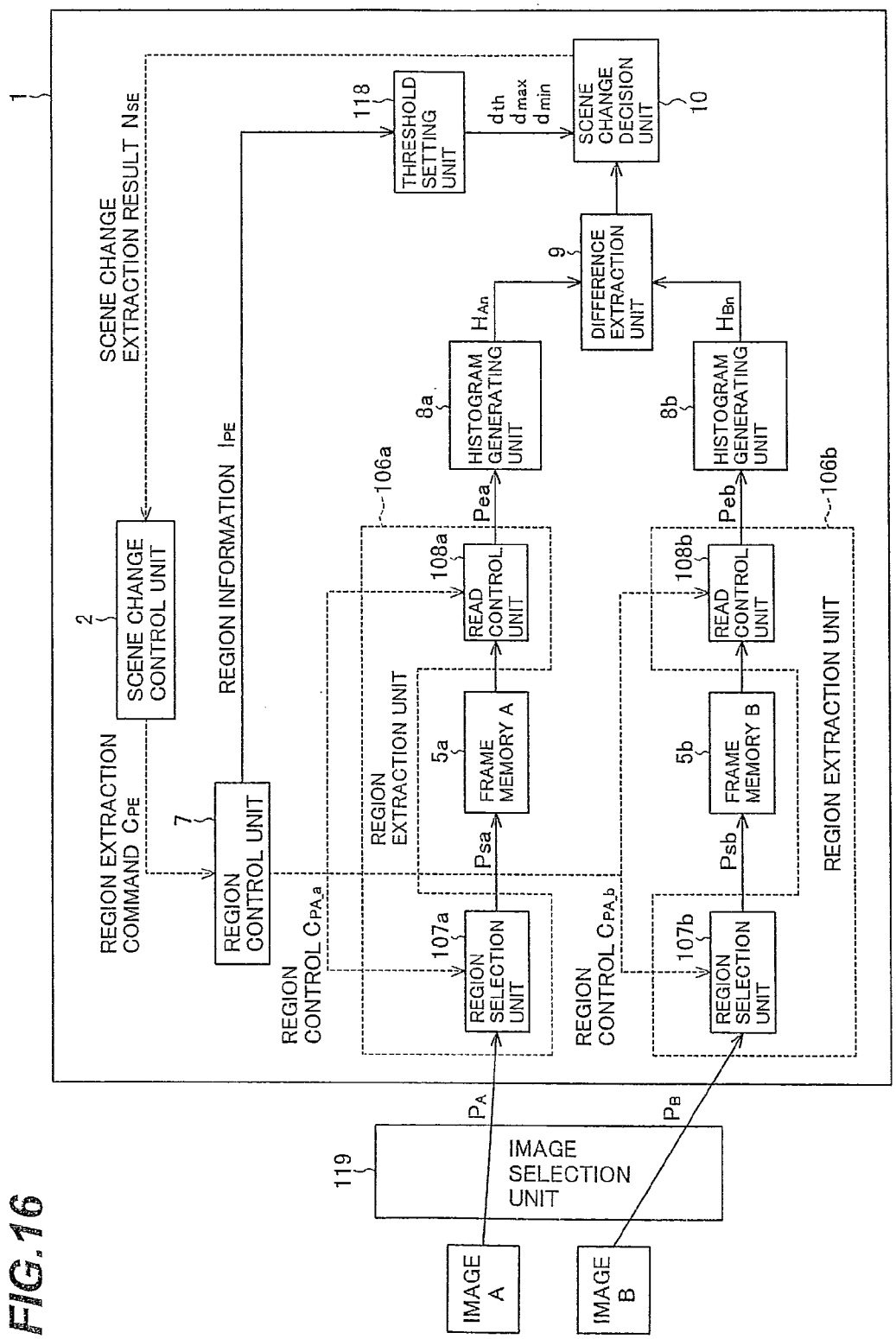
FIG. 16 is a block diagram illustrating the structure of the scene change extraction apparatus in a seventh embodiment of the invention.

FIG. 16 is a block diagram showing the structure of the scene change detection apparatus 1 in a seventh embodiment of the invention. Despite being named a scene change detection apparatus, this embodiment will be described in relation to image difference detection in still images, to detect a difference between two desired still images. The reason is that in the detection of video scene changes, two arbitrary frame images are selected from the video stream and the difference between them is detected, so that, as long as the performance of an image comparison is concerned, there is no difference from a comparison between two still images; the only difference between video scene change detection and still image difference detection is in the difference between performing the detection process continuously or once at a time individually. Accordingly, video/image point-of-change detection will be referred to as scene change detection below, regardless of whether it is video or still images that are being compared. A scene change detection apparatus that detects an image difference between two arbitrary still images will be described in the seventh embodiment, this being the basis of video scene change detection.

As shown in FIG. 16, in the scene change detection apparatus 1 in the seventh embodiment, arbitrary image data $P_A$ or $P_B$ from a hard disk, optical disc, or other source are input through an image selection unit 119.

The scene change detection apparatus 1 has first and second region selection units 107a, 107b, first and second frame memories 5a, 5b, first and second read control units 108a, 108b, first and second histogram generating units 8a, 8b, a difference extraction unit 9, a threshold setting unit 118, a scene change decision unit 10, a scene change control unit 2, and a region control unit 7.

The scene change control unit 2 starts and ends scene detection operations and detects results (scene change extraction results and scene change decidability results (results of decisions as to whether a scene change decision is possible or not) $N_{SE}$ of decisions made by the scene change decision unit 10, and stores them in an internal memory (not shown).

The region selection units 107a, 107b extract, via image selection unit 119, subregion data Psa or Psb that constitute a part of the image data $P_A$, $P_B$ of image A or B, and write them in the frame memories 5a, 5b.

The read control units 108a, 108b extract part or all of the video data in the frame memories 5a, 5b as video data Pea, Peb of the regions for analysis.

Part or all of the data written in the frame memories 5a, 5b by the region selection units 107a, 107b is thereby selected by the read control units 108a, 108b and extracted as the video data of the regions for analysis.

'Extracting the video data of a region' may be referred to below simply as 'extracting a region.'

The region control unit 7, on command from the scene change control unit 2, sets regions to be extracted by the region selection units 107a, 107b from the entire region of one frame of the image data.

Each of the frame memories 5a, 5b has a data area for at least one screen of a still image, that is, for one frame, and temporarily stores image data of any size from one pixel to one frame.

In this embodiment, the image data of the subregions extracted as described later by the region selection units 107a, 107b are written in the frame memories 5a, 5b, and of the written image data, the histogram generating units 8a and 8b generate histograms for the image data read by the read control units 108a, 108b and the difference extraction unit 9 extracts the difference between the two histograms. Thus the region set by the region control unit 7 is the region for analysis and the scene change detection region. The region for analysis or the scene change detection region may also be referred to simply as the 'detection region' or 'comparison region' below. As described above, part or all of the data written in the frame memories 5a, 5b by the region selection units 107a, 107b is selected by the read control units 108a, 108b and extracted as video data of the region for analysis, so the region selection units 107a, 107b and the read control units 108a, 108b constitute region extraction means 106a, 106b.

The histogram generating units 8a, 8b generate histograms of the image data of the scene change detection regions extracted by the region selection units 107a, 107b and read control units 108a, 108b.

When a histogram is generated, it suffices to generate a histogram for one component, or two or more components, of the video data: for example, a histogram of the luminance signal, a histogram of the color difference signals, or a histogram of the color signals (R, G, B), may be generated.

The region selection units 107a, 107b, the read control units 108a, 108b and the histogram generating units 8a, 8b are provided independently to carry out similar processing on image A and image B. However, the regions written in the frame memories 5a, 5b are not necessarily the same.

The difference extraction unit 9 calculates a difference (difference value) d between the histogram $H_A$ generated by histogram generating unit 8a and histogram $H_B$ generated by histogram generating unit 8b by the equation (1) given in the first embodiment.

In this embodiment, the entire image region (all of each frame) is divided into several zones (divided regions), and the area of the region for analysis, and accordingly the amount of image data Pea of the region for analysis, increases together with the number n of zones being analyzed, from among the divided zones. In the example in the drawings, when n=1 only zone Z1 is the scene change detection region, when n=2 zone Z1 and zone Z2 are the scene change detection region, when n=3 zone Z1, zone Z2, and zone Z3 are the scene change detection region, and so on; the scene change detection region is determined from the number of trials n, finally matching the entire image data region when n=N (=8). Now, equation (2) above can be expressed as the following equation (22), using the number of trials n as a variable.

[Formula 21]

$$Hist_A(k) - \sum_{i=1}^{n} hist_{Ai}(k) \quad (22)$$

That is, the histogram $Hist_A(k)$ of the region for analysis in image $P_A$ (the frequency of class k in the histogram) can be expressed as the sum of n unit zone histograms $hist_{Ai}(k)$.

The scene change decision unit 10 compares the difference value d calculated by the difference extraction unit 9 and a scene change decision threshold value (hereinafter, 'scene change threshold value') $d_{th}$ supplied from the threshold setting unit 118, and when the difference value d exceeds the scene change threshold value $d_{th}$, that is, when the condition expressed in the following expression (23) is satisfied, the scene change decision unit 10 decides that a scene change has occurred between the images.

$$d \geq d_{th} \quad (23)$$

Besides setting the threshold value $d_{th}$ for detecting scene changes, the threshold setting unit 118 has other threshold values for deciding whether a scene change decision is possible or not (scene change decision). One example is a value $d_{max}$ (scene change upper decision limit) large enough to decide that there has been a scene change because the difference value d calculated by comparing the images in the detection regions is so large that, even though the detection region is only part of the entire image region, it would be decided that a scene change had occurred even if the images in the remaining non-detection regions were completely identical; another example, conversely, is a value $d_{min}$ (scene change lower decision limit) small enough to decide that there has been no scene change because the difference value d calculated by comparing the images in the detection regions is so small that, even though the detection region is only part of the entire image region, it would be decided that no scene change had occurred even if the images in the remaining non-detection regions were completely different.

By using the upper decision limit $d_{max}$ and lower decision limit $d_{min}$, the scene change decision unit can detect the occurrence of a scene change in the entire areas of images A and B even when the scene change decision region is not the entire image but only part of it. Since the upper threshold $d_{max}$ and lower threshold $d_{min}$ must be changed according to the size of the detection regions, the threshold setting unit 118 changes the settings of the upper threshold $d_{max}$ and lower threshold $d_{min}$ according to region information $I_{PE}$ sent from the region control unit 7.

Next, the operation of the scene change detection apparatus 1 will be described. When a command for starting the scene change detection operation i set in the scene change control unit 2, the region control unit 7, using region control signals $C_{PA_a}$, $C_{PA_b}$, including extraction region information determined according to a region determination method described elsewhere, commands the region selection units 107a, 107b and the read control units 108a, 108b to extract regions. The region selection units 107a, 107b read image data Psa and Psb of the regions designated by the region control unit 7 from image A and image B, the difference between which is to be detected, into frame memories 5a, 5b, respectively, and the histogram generating units 8a, 8b generate histograms for regions selected by the read control units 108a, 108b, which select part or all of the data of the images read into the frame memories under control of the region control unit 7. Using the histograms $H_{An}$ and $H_{Bn}$ generated up to the nth zone, the difference extraction unit 9 calculates a difference value d between the images in the regions extracted from image A and image B. The scene change decision unit 10 compares the difference value d with the scene change threshold $d_{th}$ set by the threshold setting unit 118, and decides that a scene change has occurred if the condition shown by expression (22) is satisfied.

Figure 17:
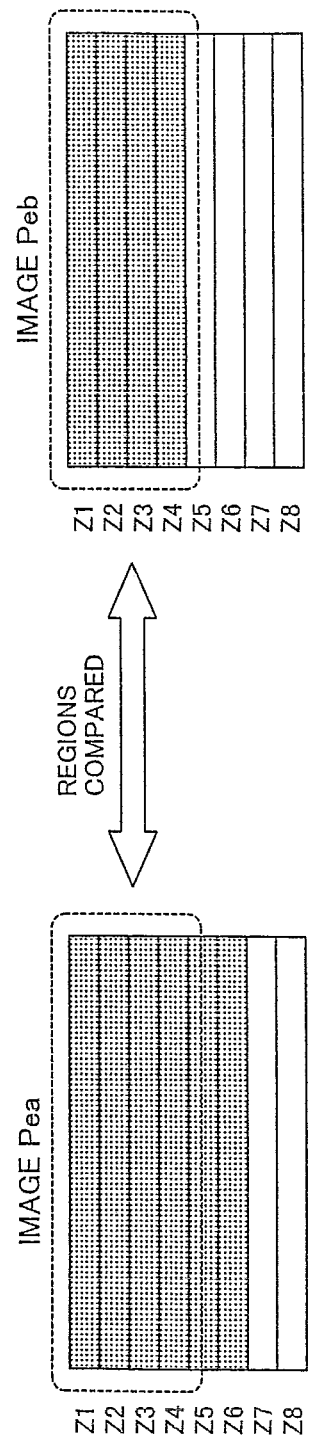
FIG. 17 is a drawing showing an example of region division in the scene change extraction apparatus in the seventh embodiment.

As the region division method, it will be assumed here that the entire area of the image of one frame in the image data is divided into eight band-like zones (slices) Z1-Z8 as shown in FIG. 17 and that the data up to a particular zone have been read into the frame memories 5a, 5b. In FIG. 17, the data up to zone Z6 in image A have been read, and the data up to zone Z4 in image B have been read. The read control units 108a, 108b read the zones from Z1 to Z4 written in the frame memories 5a, 5b as the regions for analysis in image A and image B, and the histogram generating units 8a, 8b generate histograms for the data of the zones Z1 to Z4 read by the read control units 108a, 108b.

The difference extraction unit 9 obtains the difference value d between the subregion histograms (the histograms from zone Z1 up to zone Zn (where n is from 1 to 8)) $H_{An}$ and $H_{Bn}$, and the scene change decision unit 10 compares the difference value d with the scene change upper decision limit value $d_{max}$ and the scene change lower decision limit value $d_{min}$. If the difference value d exceeds the scene change upper decision limit value $d_{max}$, the scene change decision unit 10 determines that a scene change has occurred, and if d is less than the scene change lower decision limit value $d_{min}$, it determines that a scene change has not occurred; in either of these cases, scene change detection on image A and image B ends.

If the difference value d is between the scene change lower decision limit value $d_{min}$ and the scene change upper decision limit value $d_{max}$ whether a scene change has occurred or not cannot be determined, so the scene change control unit 2 sends the region control unit 7 a control signal commanding it to expand the regions, and in this case a control signal $C_{PA_b}$ is sent from the region control unit 7 to region selection unit 107b to expand the region in image B by adding another zone. Region selection unit 107b reads zone Z5 of image B into frame memory 5b. Read control unit 108b reads the data of the added zone Z5, and histogram generating unit 8b generates a histogram $H_{Bn}$ for the region from zones Z1 to Z5. Read control unit 108a also reads the data of zone Z5, and histogram generating unit 8a, adjusting to the region size in image B, generates a histogram $H_{An}$ for the region from zones Z1 to Z5.

The difference extraction unit 9 obtains a difference value d from the histograms $H_{An}$ and $H_{Bn}$ of the expanded regions including zones Z1 to Z5. The threshold setting unit 118, which has received region information $I_{PE}$ from the region control unit 7, now resets the scene change upper decision limit value $d_{max}$ and scene change lower decision limit value $d_{min}$ based on the region information $I_{PE}$. The scene change decision unit 10 compares the difference value d with the scene change upper decision limit value $d_{max}$ and scene change lower decision limit value $d_{min}$ set by the threshold setting unit 118: if the difference value d exceeds the scene change upper decision limit value $d_{max}$, (if expression (24B) below is satisfied), it decides that a scene change has occurred; if the difference valued d is less than the scene change lower decision limit value $d_{rain}$ (if expression (24A) below is satisfied), it decides that a scene change has not occurred.

$$d < d_{min} \quad (24A)$$

$$d_{max} < d \quad (24B)$$

Figure 18:
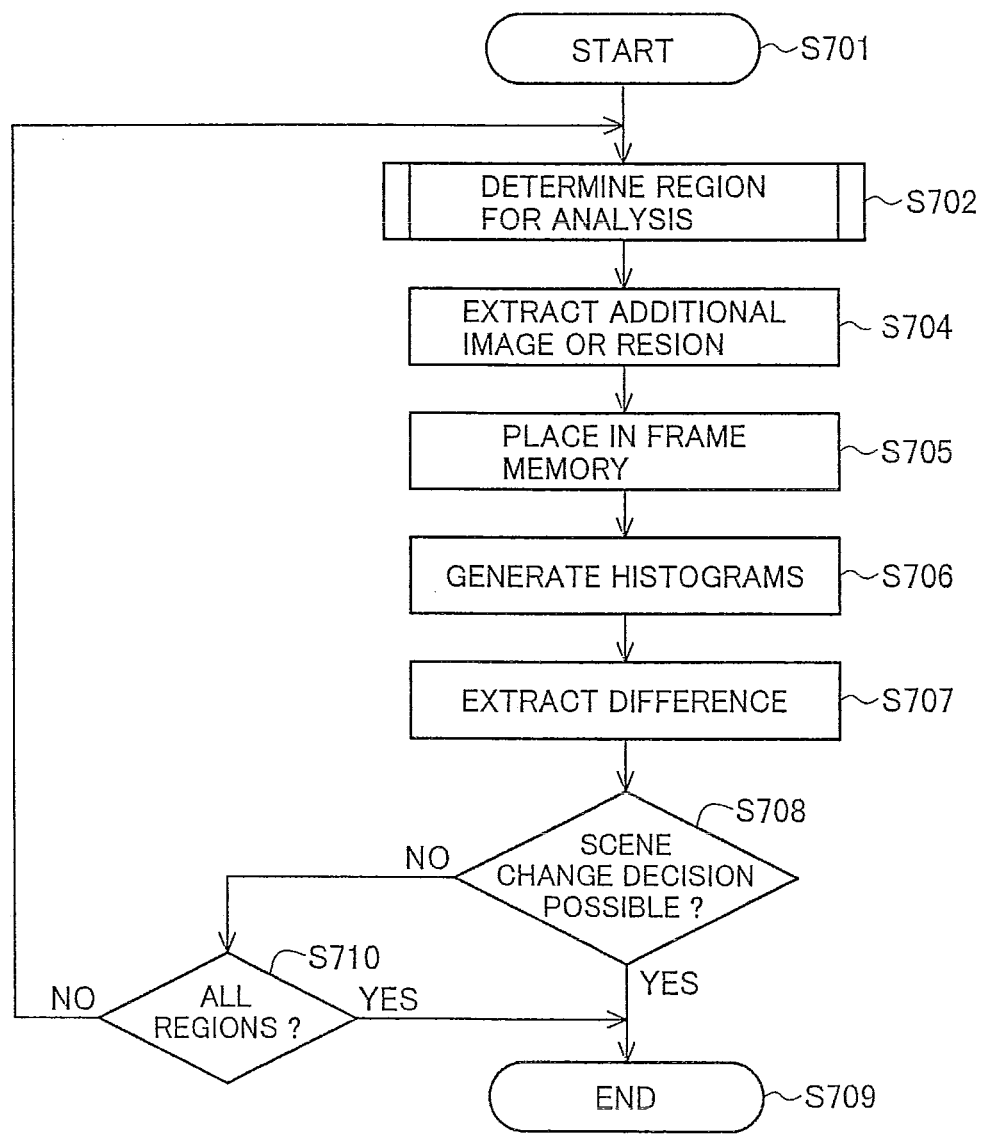
FIG. 18 is a flowchart illustrating the operation of the seventh embodiment.
Figure 19:
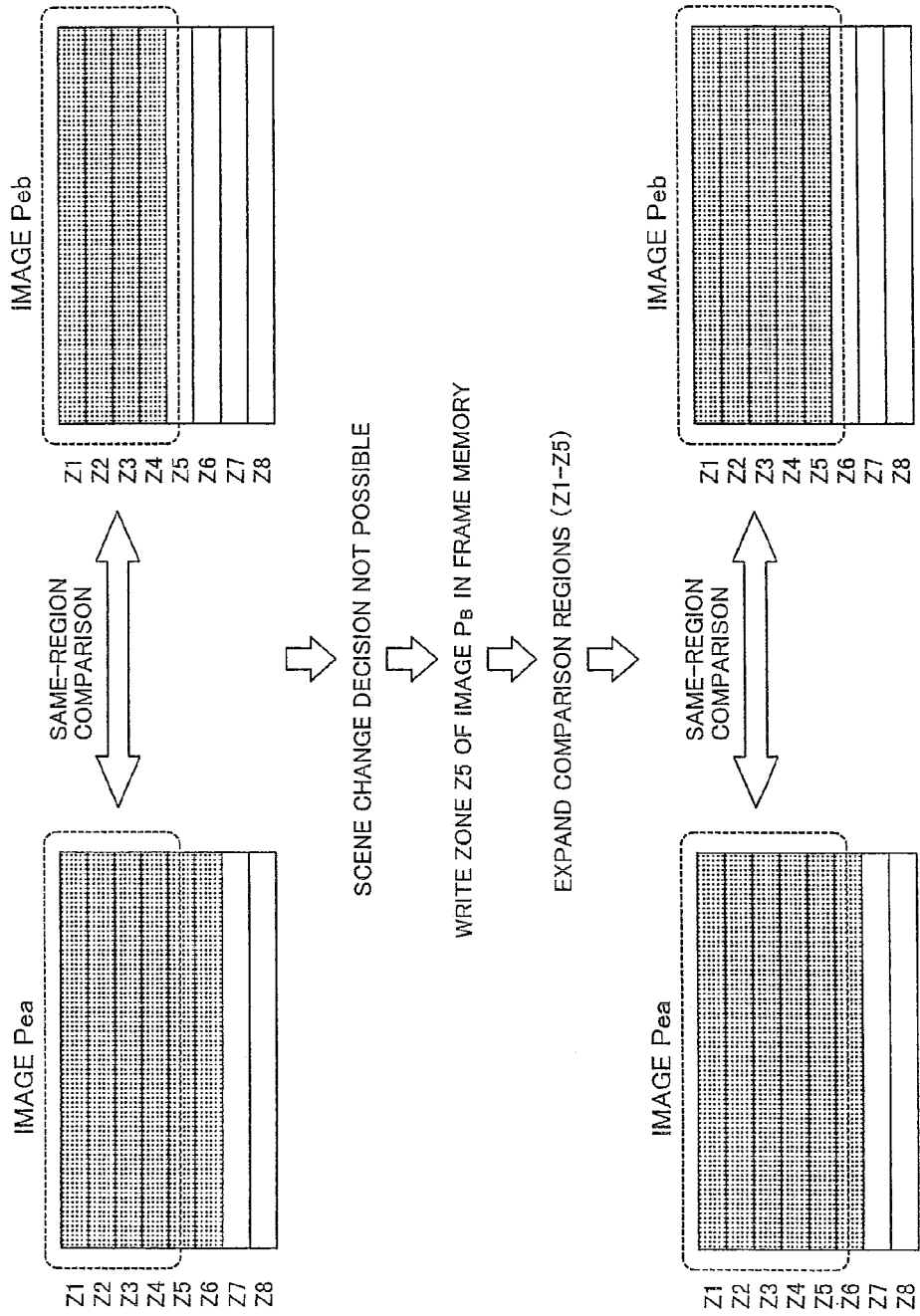
FIG. 19 is a drawing illustrating a method of selecting regions for analysis in the seventh embodiment.

Next, the processing procedure when differing regions of images A and B have been read into the frame memories 5a, 5b, as shown in FIG. 19, will be explained with reference to FIG. 18. This explanation is made on the assumption that zones Z1 to Z6 of image A have been read into frame memory 5a and zones Z1 to Z4 of image B have been read into frame memory 5b. In FIG. 18, when the scene change extraction process is started (S701), the read control units 108a, 108b compare the size of the regions of image A and image B read into the frame memories 5a, 5b and set the region designated by the dotted line in FIG. 19 (the region from zones Z1 to Z4), which is common to images A and B, as the scene change decision region (S702). The data of this region are extracted from image A and image B (S704) and placed in the frame memories 5a, 5b (S705), the histogram generating units 8a, 8b generate respective histograms (S706), and the difference value d is calculated (S707). In step S708, as explained above, if the difference value d exceeds the scene change upper decision limit value $d_{max}$, it is decided that a scene change has occurred, and if the value d is less than the scene change lower decision limit value $d_{min}$, it is decided that a scene change has not occurred. When it cannot be determined by this process whether a scene change has occurred or not, that is, when $$d_{min} \leq d \leq d_{max}$$

the process returns to step S702 to set the image size.

Since a scene change decision could not be made with the regions used the previous time, in step S702, a decision is made to add zone Z5 of image B, and the additional zone Z5 is extracted from image B (S704) and written in the frame memory (S705). Histograms for the subregions from zones Z1 to Z5 in image A and image B are obtained (S706), the difference value d is calculated (S707), the scene change decision conditions (expressions (24A) and 24B)) are tested, and if neither condition is satisfied, the process returns to step S702 after confirming that the region being analyzed has not yet reached one entire frame ('No' in step S710). If one of the conditions is satisfied in step S708, that is, if a scene change decision has been made, the process ends (S709). The process also ends (S709) if it is decided in step S710 that the entire frame has already been analyzed.

Figure 20:
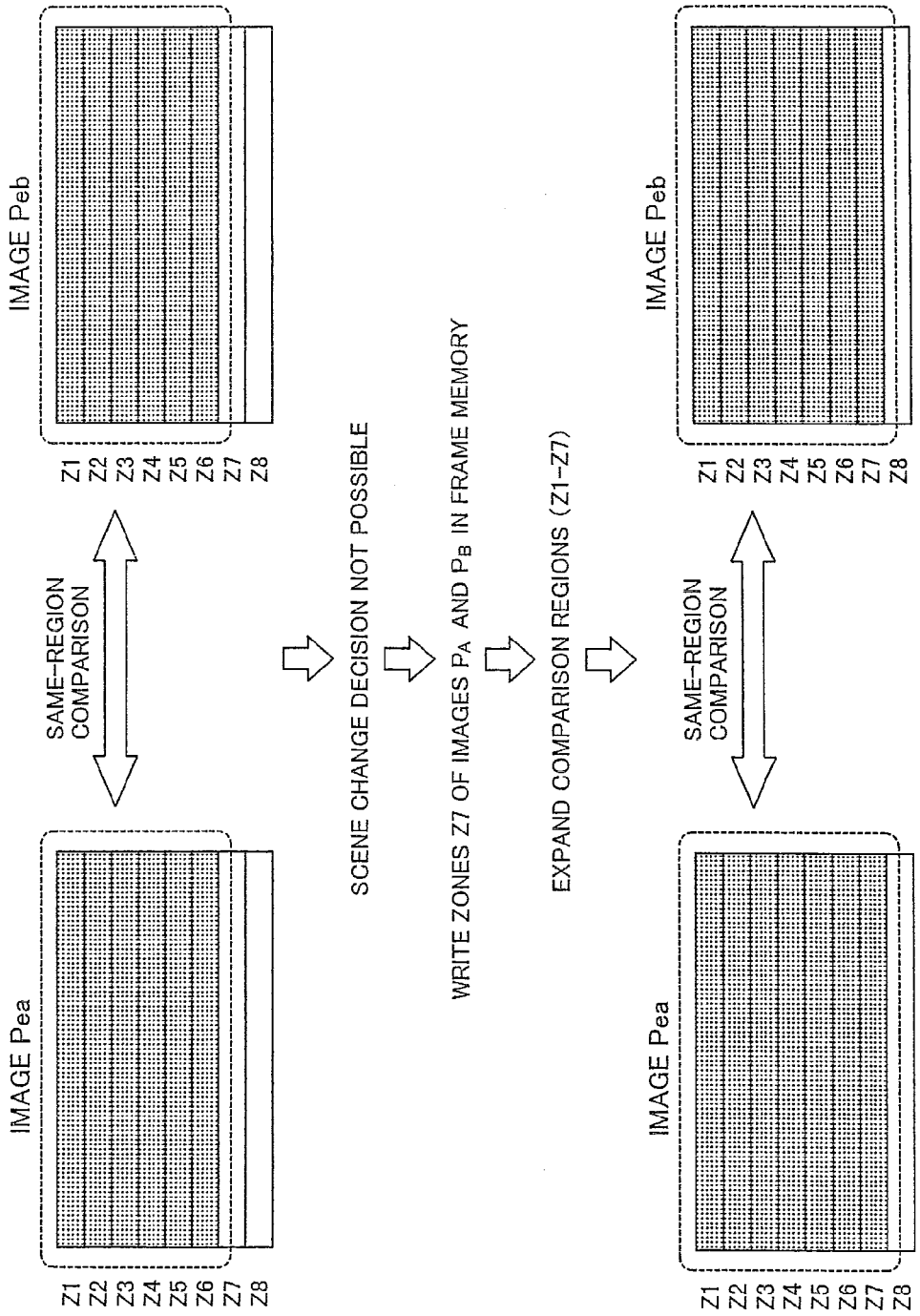
FIG. 20 is a drawing illustrating a method of selecting regions for analysis in the seventh embodiment.

Next a case in which the same regions in images A and B have been read into the frame memories 5a, 5b will be described with reference to FIG. 20. In this case, after the processing from steps S701 to S705, histograms are generated for the subregions consisting of zones Z1 to Z6 (S706), and the difference value is extracted (S707). A scene change decision is made at this point (S708); it will be assumed that the scene change decision was not possible. Next, in the setting of the region size in image A and image B in step S702, since image A and image B have the same size, zone Z7 is added to the region for analysis in image A and image B, and zone Z7 is extracted from image A and image B, respectively, (S704) and written into the frame memories 5. The histogram generating units 8a, 8b calculate histograms for the subregions consisting of zones Z1 to Z7, the difference value between the histograms is calculated (S707), and the scene change and scene change decision conditions are tested. If a scene change decision condition is satisfied, the scene change processing ends (S709); otherwise, the process returns to step S702, after confirming that the region being analyzed has not yet reached one entire frame ('No' in step S710), and the processing for scene change detection continues with the region for analysis expanded. This expansion of the region for analysis is executed until there is no effective image left (when it is decided in step S710 that the region being analyzed has reached one entire frame), and if a scene change decision condition has not been satisfied even at the stage when histograms and difference values have been obtained for the entire image region in one frame (all zones), it is decided that no clear significant difference has occurred between the images considered in this detection process.

Figure 21:
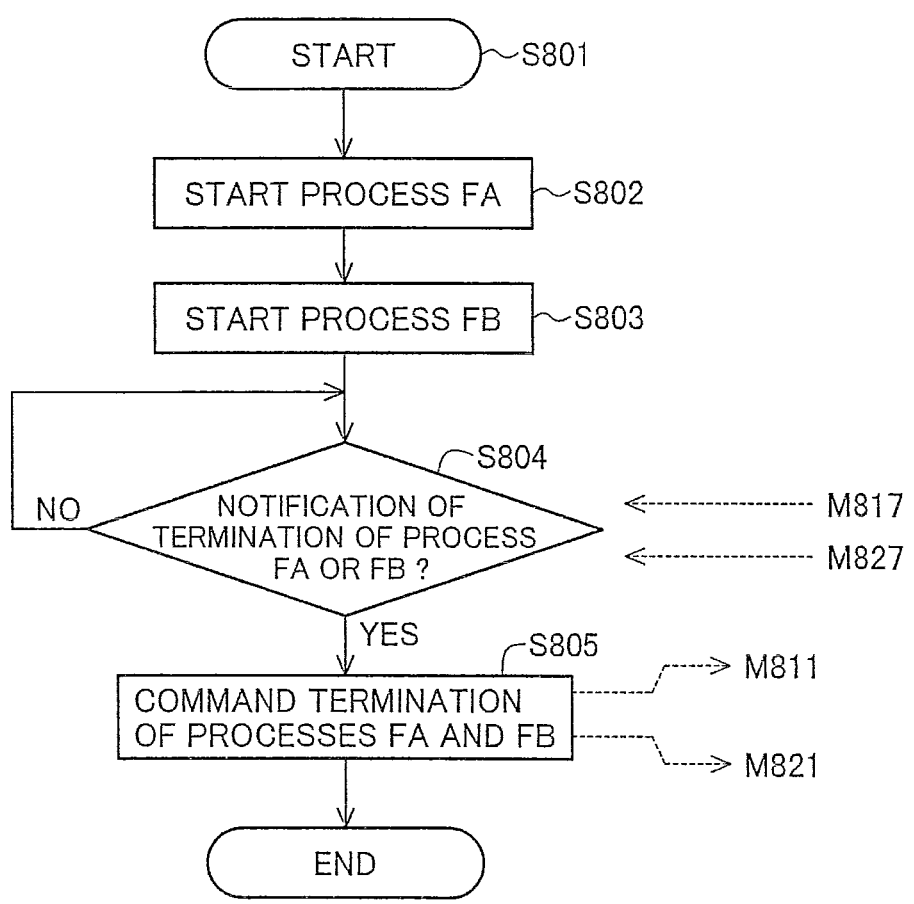
FIG. 21 is a flowchart illustrating the main task when the scene change processing for each image is performed concurrently.
Figure 22:
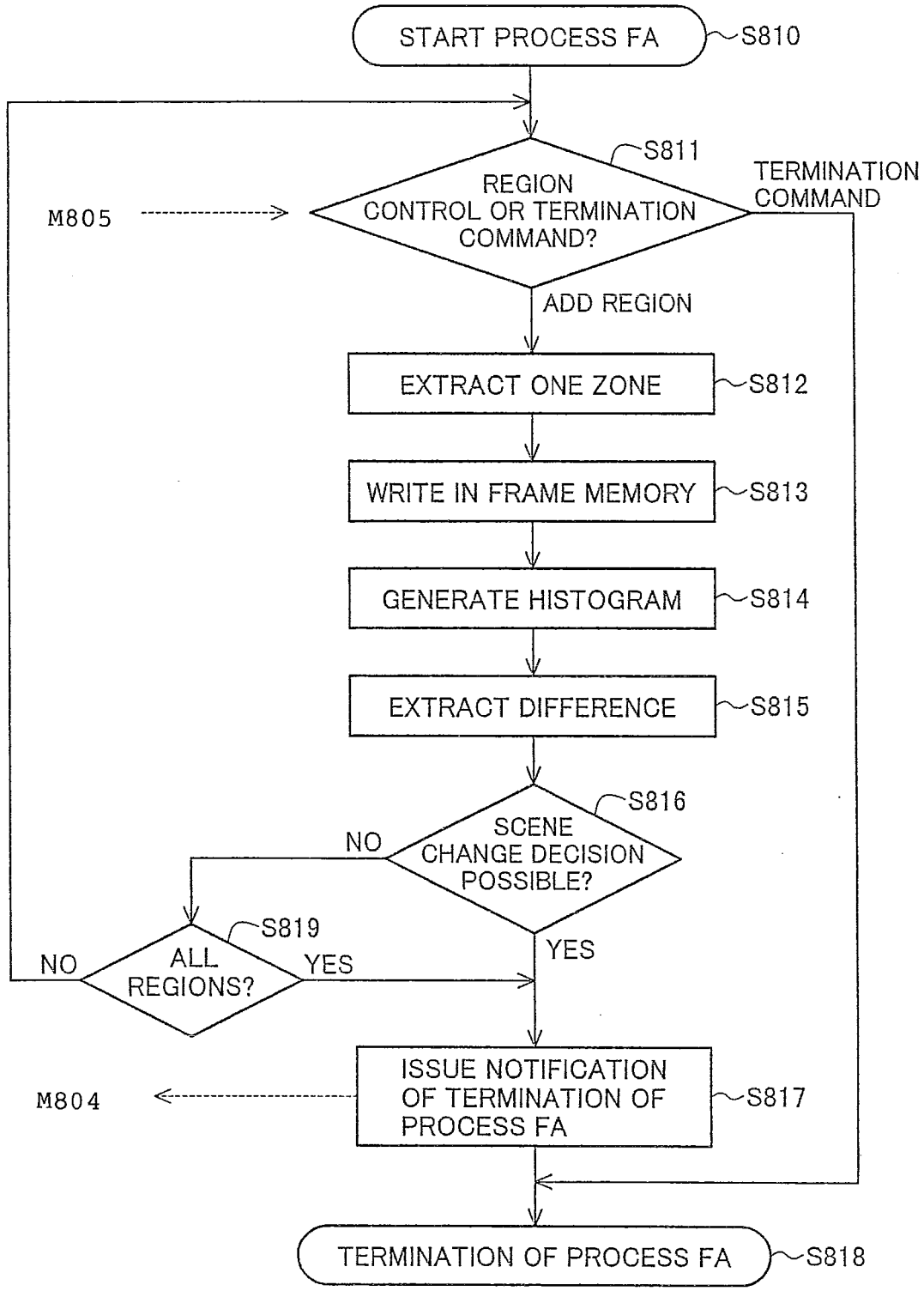
FIG. 22 is a flowchart illustrating process FA for image A when the scene change processing for each image is performed concurrently.
Figure 23:
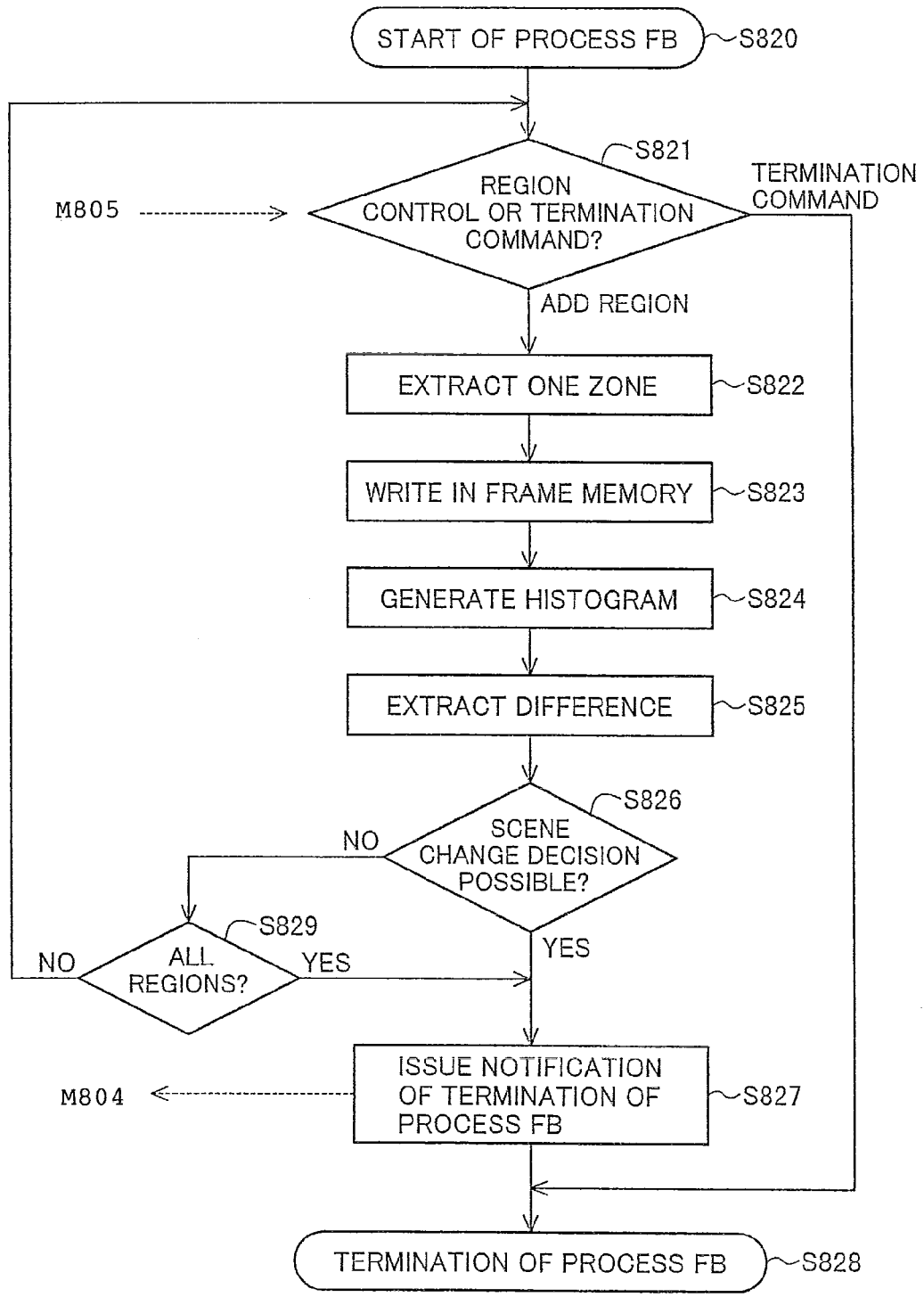
FIG. 23 is a flowchart illustrating process FB for image B when the scene change processing for each image is performed concurrently.

Next, an exemplary procedure for executing the processing of image A and the processing of image B for detecting scene changes in the images of image A and image B concurrently will be shown in FIGS. 21 to 23.

In the main task, shown in FIG. 21, when the scene change detection process is started (S801), commands are issued to start process FA, shown in FIG. 22, on image A (S802) and process FB, shown in FIG. 23, on image B (S803); then a state of waiting for termination of process FA or FB in step S804 is entered.

The process FA shown in FIG. 22 and the process FB shown in FIG. 23 are only shown as processing images A and B as separate tasks; the content of the processing is the same, so only process FA will be described below.

As shown in FIG. 22, the activated process FA (S810) first waits for the region control unit 7 to set region control signal $C_{PA_a}$ or for the command M811 that terminates process FA to be received (S811). Region selection unit 107a, upon receiving region control signal $C_{PA_a}$ from the region control unit 7, extracts a zone from image A (S812) and writes it into frame memory 5a (S813). Next, read control unit 108a reads data from frame memory 5a, histogram generating unit 8a generates a histogram (S814), and the difference between the histogram thus generated and the histogram similarly calculated in process FB is obtained (S815).

Next, the difference value d is compared with the scene change upper decision limit value $d_{max}$ and scene change lower decision limit value $d_{min}$ according to expressions (24A) and (24B): if the difference value d exceeds the scene change upper decision limit value $d_{max}$, it is decided that a scene change has occurred: if the value d is less than the scene change lower decision limit value $d_{min}$, it is decided that a scene change has not occurred (S816).

If it is decided that a scene change decision is not possible, a transition is made to the state of waiting for a region control signal $C_{PA_a}$ from the region control unit 7 or a process FA termination command (S811), after confirming that the region to be analyzed has not yet reached one entire frame ('No' in step S819). If it is decided that a scene change decision is possible and that a scene change has occurred or has not occurred, a notification (M187) of the termination of process FA is issued (S817) and the process ends (S818). The process also ends (S817) if it is determined in step S819 that the entire frame has been analyzed.

The main task is waiting for notification of the termination of process FA or process FB; when it receives notification of the termination of process FA from step S817, it gives a command to terminate process FB (S805). In the step of waiting for region control (S821), process FB is waiting for region control $C_{PA_b}$ from the region control unit 7 or a termination command from the main task; when a termination command is issued from the main task (S805), process FB is released from the region control wait (S821) and terminates (S828).

Conversely, process FB does likewise if it completes a scene change decision earlier.

In this embodiment, an apparatus and method for detecting an image difference between any two still images have been described, but the embodiment can also be applied to detect scene change points in video. This is because, as noted above, video is a continuous series of still images, and scene changes can be detected by comparing the image difference between any two still images in a video stream.

The above structure enables differences between two images to be detected.

In the detection of differences between two images, differences between entire images can be detected from subregions, without the need to process the data of the entire images.

In addition, the number of accesses to the hard disk, optical disc, or other device that stores the image data on the input side of the image selection unit 119 can be reduced, and the access time and transfer time can be reduced, because it is not always necessary to read the entire area (all zones) of the two images to be compared into the frame memories 5a, 5b.

In addition, the time required for the scene change extraction process can be reduced because the scene change detection regions do not always include the entire area (all zones) of the two images that are compared. The load on the scene change detecting apparatus performing the processing can also be reduced.

In addition, among the divided regions, if sufficient difference is found in zones that become scene change extraction regions early, such as zones Z1 and Z2, to decide that a scene change has occurred, there is no need to analyze all the zones, so the scene change extraction can be completed rapidly.

Also, even when a scene change decision cannot be reached with some subregion, the scene change decision becomes possible by successive expansion of the detection region, and the scene change decision can be performed on the minimum subregion.

Also, since the subregion on which the scene change analysis is performed is successively expanded, in the comparison of image differences between two images, it suffices to read the minimum image regions; consequently, the processing time can be speeded up.

In this embodiment, the maximum number of scene change detection regions is fixed at all regions of the image, but this number may be varied. In other words, this embodiment may be configured to vary the maximum number of scene change detection regions (the maximum limit) each time scene change detection is performed. The sensitivity and speed of scene change detection can be controlled in this way. Scene change detection precision can thereby be improved by, for example, excluding the lower part of the screen (the region near the bottom edge) from the region for analysis, to prevent scene change detection from reacting to the subtitles often displayed in the lower regions (regions near the bottom edge) of the images in movies and music programs.

When this scene change apparatus is incorporated into another system, and in other cases where the entire system is heavily loaded, by reducing the maximum number of detection regions, or by excluding intermediate regions from the detection process, the scene change detection operation can be made to finish faster, and as a result, this can contribute to reducing the system load.

The image difference detection apparatus of the seventh embodiment uses histograms to detect differences between images, but image differences may be detected by methods other than histograms, such as methods using motion vectors, or by directly comparing the pixel values at particular positions in the images to be compared. That is, image differences may be detected from differences between image characteristic values other than histograms. Image difference detection based on differences in image characteristic values other than histograms can be performed by, for example, replacing the histogram generating units 8a, 8b in FIG. 16 with means for determining image characteristic values, having the difference extraction unit 9 obtain the difference between the image characteristic values, and obtaining image characteristic values instead of generating histograms at step S706 in FIG. 18, step S814 in FIG. 22, and step S824 in FIG. 23.

Eighth Embodiment

Figure 24:
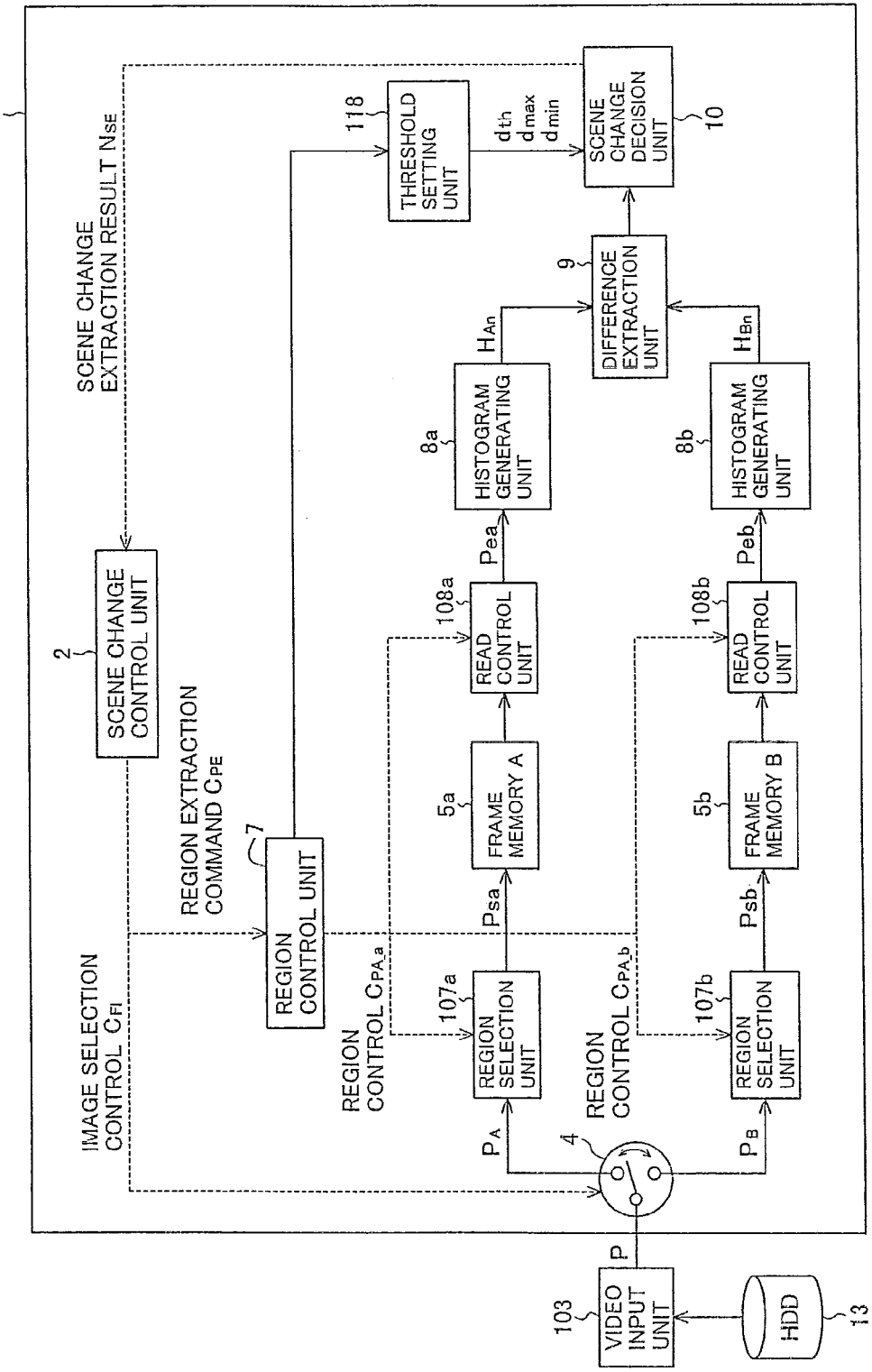
FIG. 24 is a block diagram illustrating the structure of the scene change extraction apparatus in an eighth embodiment of the invention.

FIG. 24 is a block diagram showing the structure of the scene change detection apparatus 1 in an eighth embodiment of the invention. In the seventh embodiment still images are analyzed, but in the eighth embodiment video is analyzed. In FIG. 24, the same reference characters as in FIG. 16 indicate identical or similar elements.

To the apparatus in FIG. 16 the scene change detection apparatus 1 in FIG. 24 adds a hard disk drive (HDD) 113 in which video is recorded, a video input unit 103 that extracts, from arbitrary video frames, a frame on which the scene change decision is made, and a switch 4 that switches video data P from the video input unit 103 into frame memory 5a or frame memory 5b, depending on whether the video data P belong to an odd-numbered frame or an even-numbered frame.

The switch 4 inputs two video signals in which a scene change is to be detected and switches them in units of one frame into frame memory 5a or frame memory 5b, respectively. The scene change control unit 2 throws the switch 4 to the region selection unit 107a side (the state in which the switch 4 supplies the output P from the video input unit 103 to the region selection unit 107a) or to the region selection unit 107b side (the state in which the switch 4 supplies the output P from the video input unit 103 to the region selection unit 107b) according to an image selection control signal $C_{FI}$ that switches the video data P from the video input unit 103 between the frame memory 5a and frame memory 5b.

Next, the operation of the scene change detection apparatus 1 shown in FIG. 24 will be described. When a command for starting the scene change detection operation is set in the scene change control unit 2, the video input unit 103 begins to supply video data. In accordance with a frame memory input control signal $C_{FI}$ from the scene change control unit 2, the switch 4 supplies the input video data P to region selection unit 107a if scene change detection is being performed for an odd-numbered frame, and to region selection unit 107b if scene change detection is being performed for an even-numbered frame. Alternatively, at scene change detection, a difference between frames separated from each other by several frames may be calculated, instead of a difference between adjacent frames (an odd-numbered frame and an even-numbered frame). For example, one frame may be extracted from every several frames, and a scene change may be detected based on the difference between the extracted frames. In this case, the image data of the frames that are sequentially extracted are supplied to and stored in the frame memories 5a and 5b alternately. For example, the ith frame to be extracted (after the start of operation) is supplied to one frame memory, frame memory 5a for example, if i is an odd number, and to the other frame memory (frame memory 5b), if i is an even number. In the detection of a scene change between two frames, the two frames need not temporally close to each other; they may be temporally distant from each other. In this case, one frame may be set as a reference frame, and other frames may be compared to the reference frame one by one, to detect a scene change with respect to the reference frame.

The scene change control unit 2 issues a command (region extraction command $C_{PE}$) to the region control unit 7, instructing it to extract the regions to be compared for scene change detection. The region control unit 7 sends a region control signal $C_{PA_a}$ or $C_{PA_b}$ to the region selection unit 107a or 107b and the read control unit 108a or 108b, instructing them to extract a region for scene change analysis. The region selection units 107a, 107b and the read control units 108a, 108b extract scene change extraction regions from the image data $P_A$, $P_B$ input from the video input unit 103 via the switch 4, and write them into the frame memories 5a, 5b. The subsequent processes are as explained in seventh embodiment.

Figures 25A, 25B:
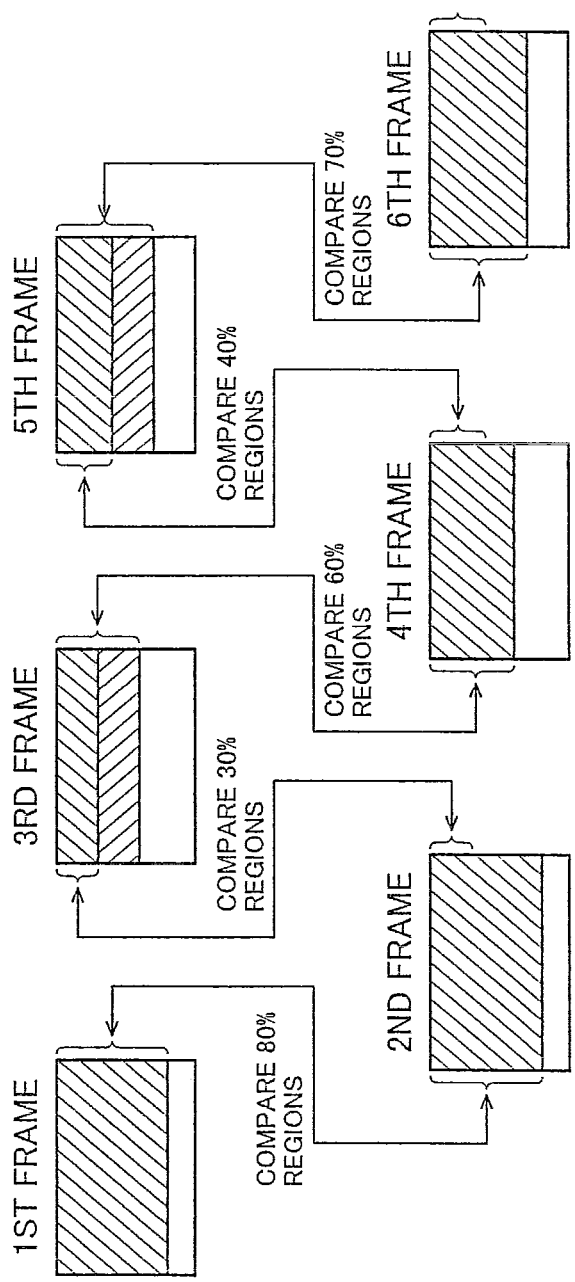
FIGS. 25(a) and 25(b) are drawings illustrating the data used when scene change detection is performed on subregions of the continuous video data in the eighth embodiment.

Next, the way in which scene changes are detected from subregions in image data will be described with reference to FIGS. 25(a) and 25(b). For the sake of simplicity, the description will assume that odd-numbered and even-numbered frames are compared alternately and that they have consecutive frame numbers. Each divided zone in each frame will occupy 10% of the entire frame, so the region is enlarged by 10% every time one zone is added. In the regions for analysis in the frames stored in the frame memories 5a, 5b in FIG. 25(a), the regions used for comparison with previous frame are hatched with lines slanting down to the left, the regions used for comparison with the next frame are hatched with lines slanting down to the right, and regions that are not analyzed are shown without hatching. FIG. 25(b) shows the percentages of the entire first to the sixth frames occupied by the regions for analysis in the comparisons with the preceding and following frames.

A continuous video comparison begins with a comparison between the first and second frames. In the comparison of the first and second frames, subregions of the first and second frames (zones) are simultaneously read into the frame memories 5a, 5b, and every time the subregions are read, histograms are generated and a scene change decision is made. The area of the regions for analysis in the first and second frames increase in increment of 10% at every analysis (10%, 20%, 30%, . . . , 70%, 80%), and the scene change decision is completed when 80% of the frames are compared.

Next, the second and third frames are compared. In the comparison of these frames, 80% of the data of the second frame has already been read, so only the data of the third frame is read, in 10% increments, into frame memory 5a, and the scene change decision can be made by calculating histograms and difference values for the part of the second and third frames that has been read into both frame memories 5a, 5b alike. It will be assumed that in scene change detection between the second and third frames, the scene change decision is completed at the 30% region, as indicated in FIGS. 25(a) and 25(b).

Next, the third and fourth frames are compared. Since 30% of the third frame has already been read into frame memory 5a, it is only necessary to read 30% of the fourth frame, in 10% increments, into frame memory 5b, calculate the histograms and difference values, and make a scene change decision as described above. If the scene change decision is not completed with the 30% region, however, the region for analysis must be expanded in the past (preceding) frame, i.e., the third frame, as well. It will be assumed here that the region in the third frame is expanded to 60% for comparison with the next frame, i.e., the fourth frame, as shown in FIGS. 25(a) and 25(b).

It should be noted that when the region for analysis is expanded as necessary (after an elapse of time) in temporally sequenced data such as video, as in the method described above, a memory region is needed to store the data of frames until scene change detection processing using those frames is completed. In this embodiment, data are read from the HDD 113, which functions as a storage medium, and as shown in the comparison between the third and fourth frames, for example, the region for analysis can be expanded in the temporally preceding third frame when it is being compared with the following frame. The method of storing the video frames is not confined to permanent storage media such as the HDD shown in this embodiment; volatile memory capable of storing several frames to several tens of frames may be used.

The comparison between the fourth and fifth frames and the comparison between the fifth and sixth frames follow in a similar manner. In the comparison between the fifth and sixth frames, the region is expanded to 70%, as shown in the drawings.

Figure 26:
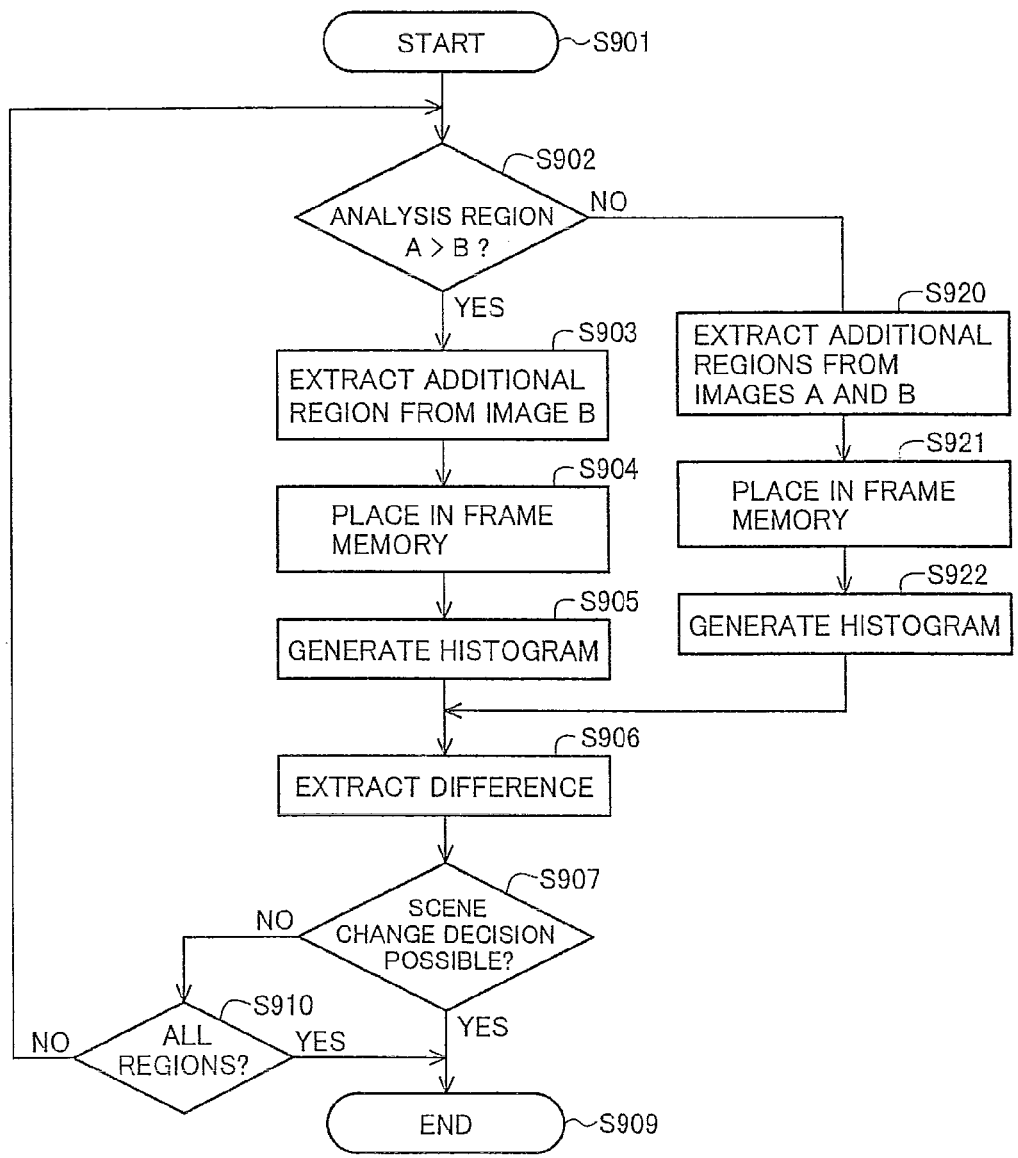
FIG. 26 is a flowchart illustrating a process for determining additional image regions in the eighth embodiment.

Next, a scene change decision sequence that performs scene change detection by dividing the image regions of a preceding image A and a following image B in a video stream will be described with reference to FIG. 26.

When scene change analysis processing starts (S901), the sizes of the regions of image A and image B that may be used for scene change analysis in the frame memories 5a, 5b are compared (S902). Given that image A has already undergone scene change detection processing with a preceding image, there will already be some subregion data in frame memory 5a, while if scene change detection processing is being executed on image B for the first time, there will be no data for a region that could be used for analysis. Therefore, image A has a larger region than image B, so the process proceeds to step S903. In step S903, as image B has the smaller region for analysis, a preset region is added and this added region is written into frame memory 5b (S904). The addition of regions is performed one zone at a time, as in FIGS. 17, 19, and 20, for example.

In step S905, a histogram is generated for the data of image B in frame memory 5b, and if there is no histogram for image A, a histogram is also generated for image A. Next, the difference value d between the histograms of image A and image B is calculated (S906), and a decision is made based on expressions (24A) and (24B) to determine whether a scene change decision is possible or not for image A and image B in their entirety (S907). If a scene change decision is possible, that is, if a scene change decision has been made, the process ends (S909); if a scene change decision cannot be made, the process returns to step S902, after confirming that the region to be analyzed has not yet reached one entire frame ('No' in step S910).

In this process, if a scene change decision cannot be made even when the decision is repeated with the subregion (region for analysis) of the temporally following image B expanded, the size of the region for analysis in image B is gradually enlarged until finally the size of the region for analysis is the same in image B as in image A. After that, the regions in both of image A and image B are expanded (S920), the data of the expanded regions are written in the frame memories 5a, 5b (S921), and histograms are generated in the histogram generating units 8a, 8b, respectively (S922). The difference extraction unit 9 calculates the difference value between the two histograms (S906) and the scene change decision unit 10 makes a scene change decision again (S907).

The above configuration enables detection of video scene changes.

It is also possible to make a scene change decision for an entire image by making a scene change decision on a partial subregion.

Furthermore, because scene change decisions are made on a subregion basis, scene change detection can be carried out faster than by comparing the entire images.

Because the scene change decision is made by successive expansion of the detection region, scene change detection can be performed with the minimum region size and minimum processing time, depending on the difference between the two images.

Ninth Embodiment

Figure 27:
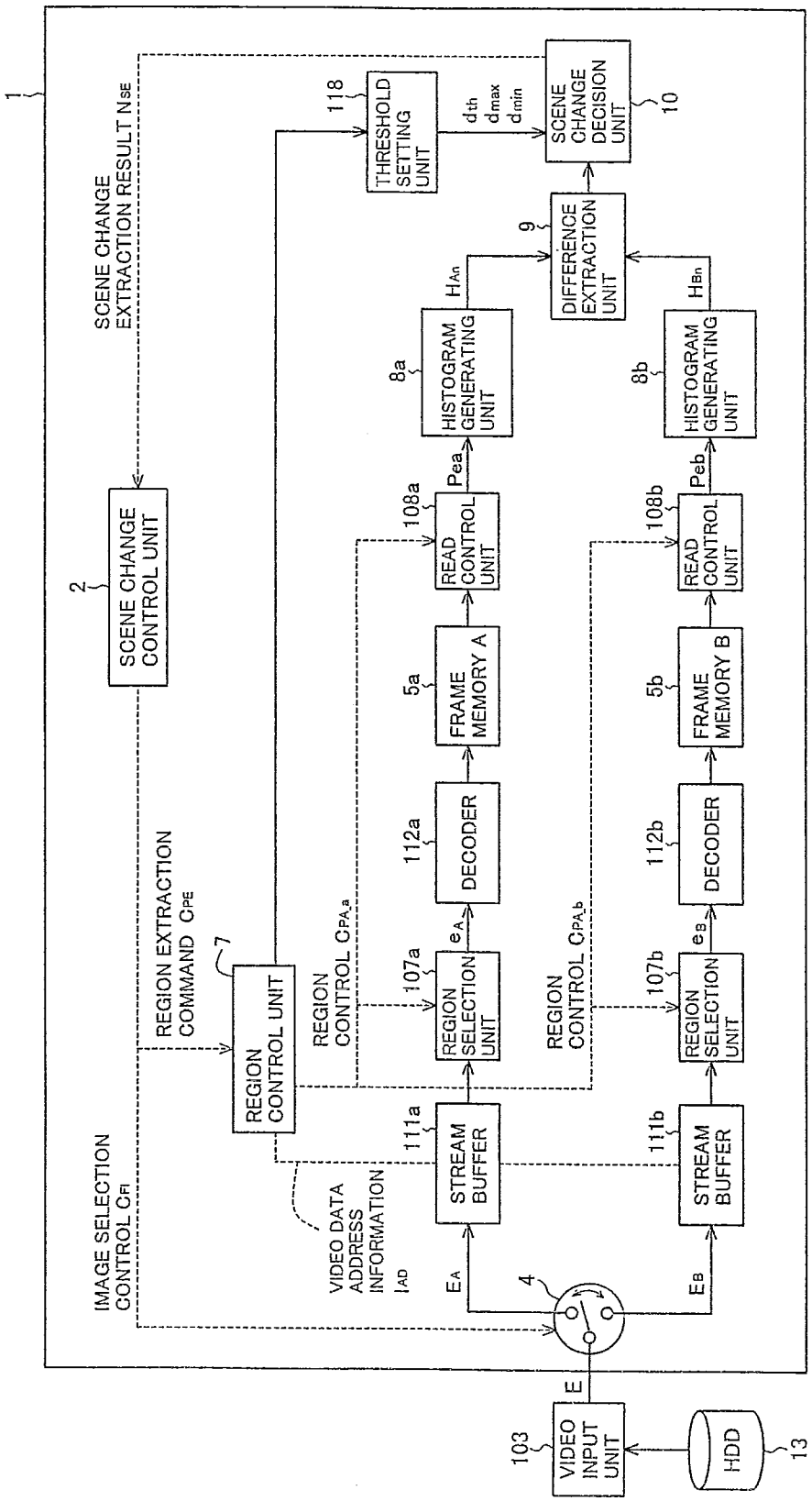
FIG. 27 is a block diagram illustrating the structure of the scene change extraction apparatus in a ninth embodiment of the invention.

FIG. 27 is a block diagram showing the structure of a scene change detection apparatus 1 in a ninth embodiment of the invention. In the ninth embodiment, compressively encoded video data are processed. Decoders 112a, 112b for decompressing compressively encoded video streams a frame at a time are therefore added. In FIG. 27, the same reference characters as in FIG. 24 indicate identical or similar elements.

A compressively encoded video stream is stored in the hard disk drive (HDD) 113 of the scene change detection apparatus 1 in FIG. 27. The switch 4 distributes compressively encoded video data P one frame at a time to the stream buffers 111a, 111b, depending on whether the frame is an odd-numbered frame or an even-numbered frame in the video stream. The stream buffers 111a, 111b temporarily store the image data P. From the encoded video data temporarily stored in the stream buffers 111a, 111b, the region selection units 107a, 107b send data corresponding to one frame or a subregion of one frame as designated by region control signals $C_{CP_a}$, $C_{PA_b}$ sent from the region control unit 7, frame by frame, to the decoders 112a, 112b.

The region control unit 7 manages data address information (recording positions) of frames and/or divided regions in the video stream data stored in the stream buffers 111a, 111b. The region control signals $C_{PA_a}$, $C_{PA_b}$ sent from the region control unit 7 to the region selection units 107a, 107b include information giving addresses in the stream buffers 111a, 111b as information indicating the recording positions of subregions to be extracted.

The decoders 112a, 112b decompress (decode) compressively encoded data corresponding to parts or subregions sent from the region selection units 107a, 107b, and write the data into the frame memories 5a, 5b. The decoders 112a, 112b can not only decompress (decode) data a frame at a time; they can decode only part of the data in one frame of data, or only the data corresponding to a subregion.

Next, the operation of the scene change detection apparatus 1 shown in FIG. 27 will be described. When a command for starting a scene change detection operation is set in the scene change control unit 2, the video input unit 103 begins to supply a compressively encoded video stream E. In accordance with a frame memory input control signal $C_{FI}$ from the scene change control unit 2, the switch 4 supplies the input video stream E to stream buffer 111a as input video stream EA if scene change detection is being performed for an odd-numbered frame, and to stream buffer 111b as input video stream EB if scene change detection is being performed for an even-numbered frame.

The scene change control unit 2 issues a command (region extraction command $C_{PE}$) to the region control unit 7, instructing it to extract regions to be compared for scene change detection (regions for analysis). The region control unit 7 sends a region control signal $C_{PA_a}$ or $C_{PA_b}$ to region selection unit 107a or 107b, instructing it to extract a region for scene change analysis. The region selection units 107a, 107b extract compressively encoded data $e_A$, $e_B$ corresponding to the region to be extracted for scene change analysis from the frame-based compressively encoded data recorded in the stream buffers 111a, 111b, and send it to the decoders 112a, 112b. The decoders 112a, 112b decode the compressively encoded data corresponding to a subregion or, at maximum, to one frame sent from the region selection units 107a, 107b and write the data into the frame memories 5a, 5b. Subsequent processing is as in the seventh embodiment.

Figure 28:
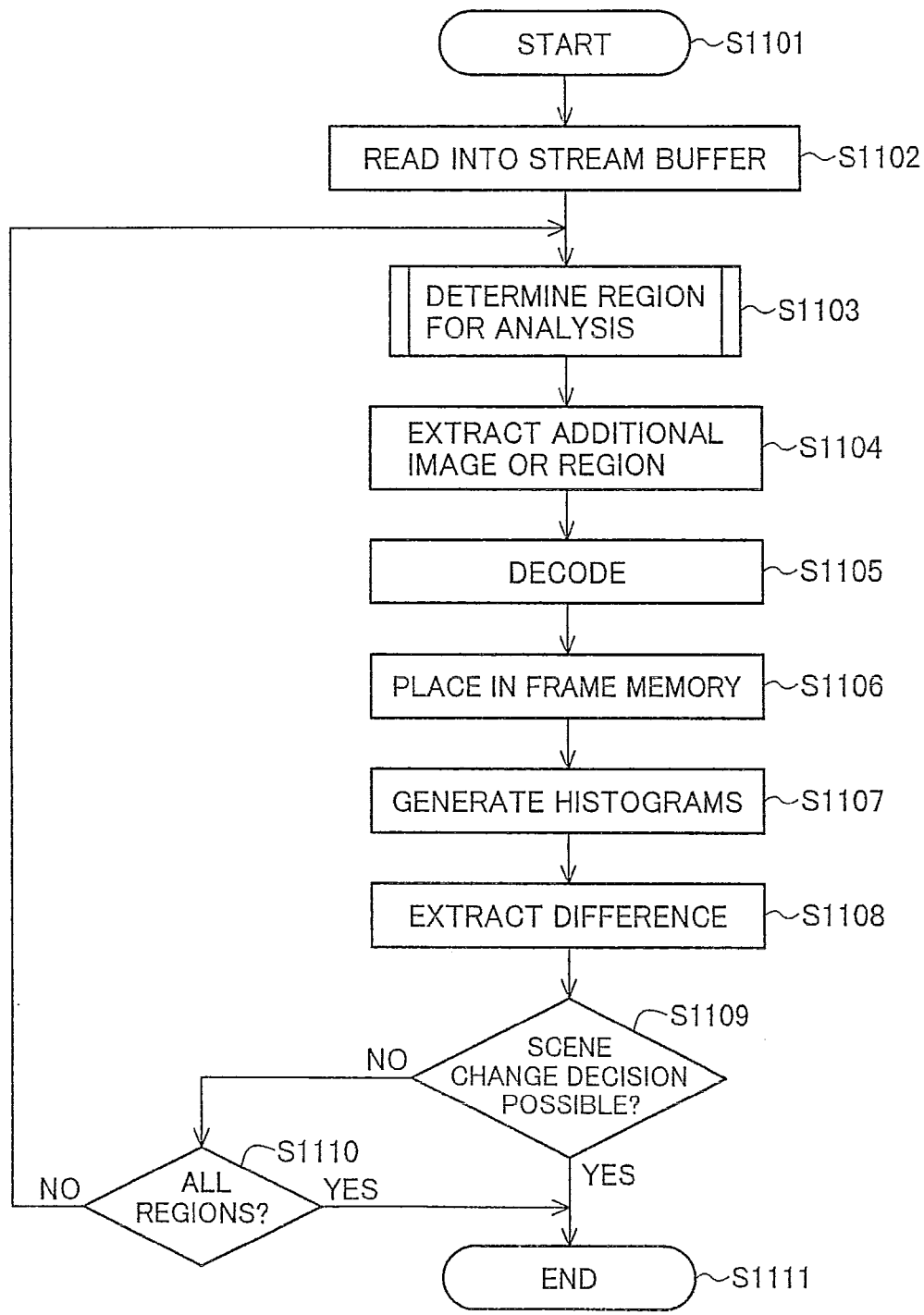
FIG. 28 is a flowchart illustrating the operation of the ninth embodiment.

Next, the way in which scene changes are extracted from subregions in compressively encoded video will be described with reference to FIG. 28.

When scene change analysis processing starts (S1101), video data corresponding to one frame are read into the stream buffers 111a, 111b, from the compressively encoded video stream stored in the HDD 113 (S1102). Next, the region control unit 7 determines the subregion to be used for scene change analysis, depending on the progress of the scene change analysis (S1103). The subregion can be determined as explained in the eighth embodiment with reference to FIG. 26.

Next, compressively encoded video data corresponding to the subregion determined in step S1103 are extracted from the stream buffers 111a, 111b (S1104). The decoders 112a, 112b decode the extracted data (S1105), and place the decoded data in the frame memories (S1106). The histogram generating units 8a, 8b generate respective histograms (S1107), and the difference extraction unit 9 calculates the difference value d between the histograms of image A and image B (S1108). Next, the scene change decision unit 10 makes a scene change decision on the difference value d according to expressions (24A) and (24B) (S1109). If a scene change decision is possible, that is, if a scene change decision has been made, the process ends (S1111); if a scene change decision cannot be made, the process returns to step S1103, after confirming that the region to be analyzed has not yet reached one entire frame ('No' in step S1110), and the region for analysis is determined again. At this time, as described below, the region in either image A or image B, whichever has the smaller region for analysis, is expanded and the processing from steps S1104 to S1109 is repeated, or the regions in both image A and image B are expanded and the processing from steps S1104 to S1109 is likewise repeated. The above process is repeated, and when expressions (24A) and (24B) are satisfied in step S1109, or the region for analysis reaches one entire frame ('Yes' in S1110), the process ends.

Figure 29:
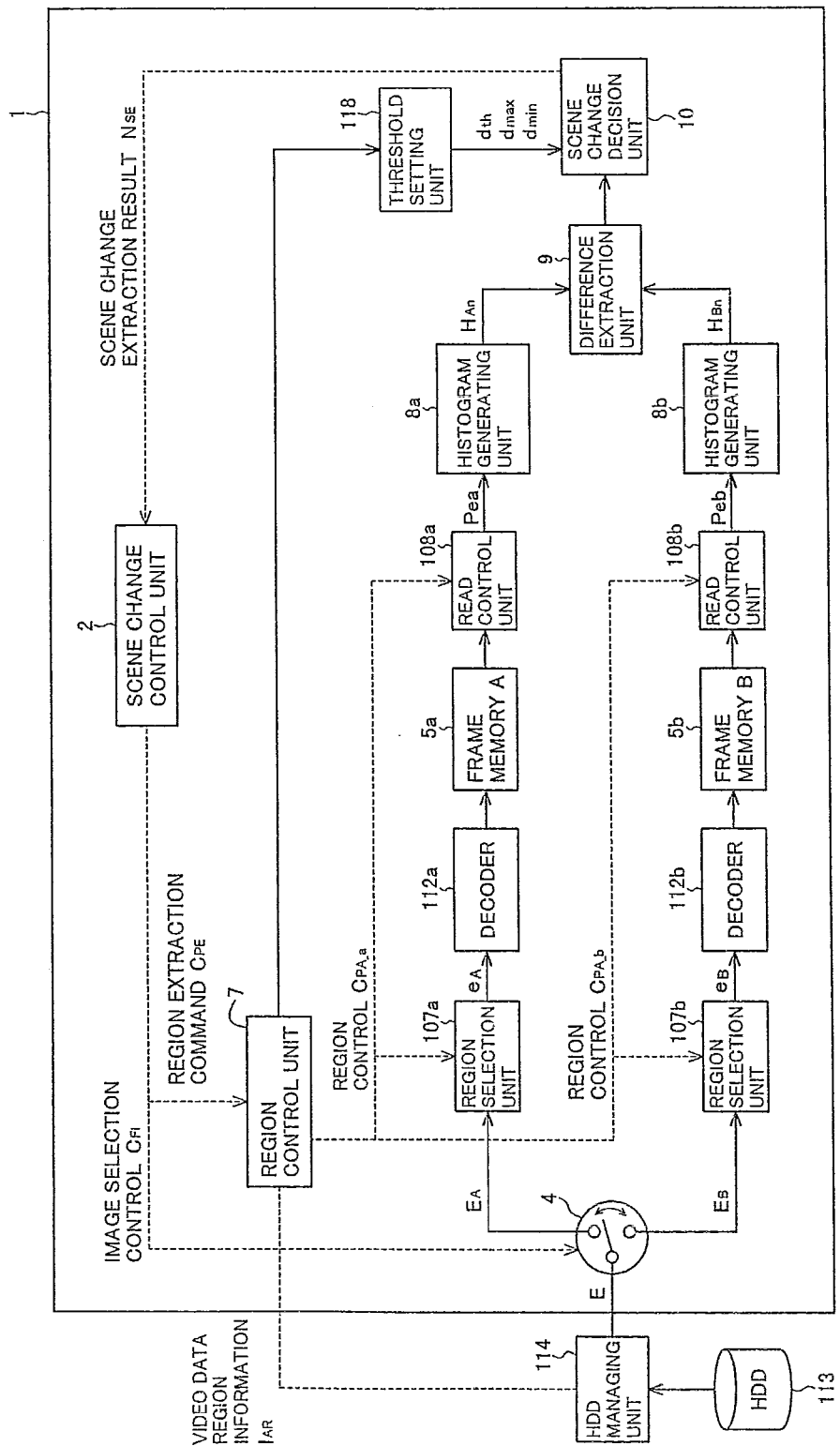
FIG. 29 is a block diagram illustrating a variation of the scene change extraction apparatus in the ninth embodiment.

This embodiment has a structure in which video is temporarily stored in the stream buffers 111a, 111b, and the region selection units 107a, 107b extract the data of one frame or a subregion of one frame under the control of the region control unit 7, which manages data address in the stream buffers 111*a*, 111*b*, so that the region control unit 7 constitutes a means for managing the recording position of one frame or a subregion thereof in the video data stored in the stream buffers 111*a*, 111*b*, but as shown in FIG. 29, a structure comprising an HDD 113 that permanently stores video and an HDD managing unit 114 that manages the address positions of single frames and subregions thereof recorded in the HDD 113, is also possible. In this structure, the region control unit 7 determines one video frame or a subregion of one frame to be analyzed, and sends video data region information IAR, which is information specifying the one frame or subregion thereof, to the HDD managing unit 114; the HDD managing unit 114 then determines the data position of the specified region in the specified frame, from the video stored in the HDD 113, and extraction is carried out by the region selection units 107*a*, 107*b*.

In this case, the HDD managing unit 114 constitutes a means for managing recording positions of single frames, or subregions thereof, of video data stored in the HDD 113, which functions as a video recording means.

Although an HDD has been shown as a permanent recording medium, the invention is not limited to HDD media; other recording media such as optical or magnetic disk media or tape media, or flash memory and the like, may also be used. The image data need not be stored permanently; it suffices if the image of each frame can be stored until scene change detection using the image of that frame is completed.

The above structures enable scene changes to be detected in video.

It is also possible to make a scene change decision for an entire image by making a scene change decision on a partial subregion, even for a compressively encoded video stream.

Furthermore, because scene change decisions are made on a subregion basis, scene change detection can be carried out faster than by comparing the entire image.

Furthermore, the processing load is light, and consequently the processing is completed rapidly, because the decoding process, which has a heavy processing load, is executed only on subregion data.

Because the scene change decision is made by successive expansion of the detection region, scene change detection can be performed with the minimum region size and minimum processing time, depending on the difference between the two images.

Furthermore, the use of non-volatile recording media such as HDD media eliminates the need to use a stream buffer for scene change extraction.

The scene change apparatus in the eighth or ninth embodiment uses histograms to detect differences between video images, but scene changes may be detected by methods other than histograms, such as methods using motion vectors, or by directly comparing the pixel values at particular positions in the images to be compared. That is, scene changes may be detected from differences in video characteristic values other than histograms. Scene change detection based on differences in video characteristic values other than histograms can be performed by, for example, replacing the histogram generating units 8*a*, 8*b* in FIGS. 24, 27, and 29 with means for determining video characteristic values, having the difference extraction unit 9 determine the difference between the video characteristic values, obtaining video characteristic values instead of generating histograms in steps S905 and 5922 in FIG. 26 and step S1107 in FIG. 28, and extracting the difference between the video characteristic values in steps S906 and S1108.

What is claimed is:

1. A scene change detection method that detects video scene changes, comprising:
   a region extraction step of extracting subregions for analysis from two frames of video data; and
   an occurrence of a scene change detection step of detecting an occurrence of a scene change between the two frames, based on a difference in video characteristic values in the entire subregions of the two frames extracted by the region extraction step; wherein
   when a scene change is detected to have occurred by the scene change detection step, a final judgment is made immediately that a scene change is present between said two frames; and wherein
   when no scene change is detected to occur by the scene change detection step, the region extraction step expands the regions for analysis by adding new regions extracted from regions that were not previously included in the regions for analysis, and the scene change detection step performs the detection of the scene change again, based on video differences between the entire expanded regions for analysis, wherein the entire expanded regions include the newly added regions and the regions which were previously used for the scene change,
   wherein the video characteristic values are histograms and the occurrence of a scene change is detected after obtaining cumulative histograms by adding histograms of the newly added regions to the histograms accumulated so far, and wherein
   when a judgment is made from the values of the cumulative histograms up to previous trial that whatever values the histograms of the newly added regions might take, they would not produce a scene change, a histogram accumulation process is carried out without carrying out the scene change detection step.

2. The scene change detection method of claim 1, wherein a scene change decision threshold value in the scene change detection step is varied depending on an area or a position of the regions for analysis.

3. A scene change detection method that detects video scene changes, comprising:
   a region extraction step of extracting subregions for analysis from two frames of video data;
   a video characteristic analysis step of calculating video characteristic values for the video data in the entire subregions extracted by the region extraction step;
   an accumulation step of obtaining cumulative video characteristic values by cumulatively adding the video characteristic values calculated by the video characteristic analysis step; and
   an occurrence of a scene change detection step of detecting a scene change between the two frames, based on the cumulative video characteristic values of obtained for the two frames; wherein
   when a scene change is detected to have occurred by the scene change detection step, a final judgment is made immediately that a scene change is present between said two frames; and wherein
   when no scene change is detected to occur by the scene change detection step, the region extraction step expands the regions for analysis by adding new regions extracted from regions that were not previously included in the regions for analysis, and the scene change detection step performs the detection of the scene change again, based on the cumulative video characteristic values of the entire expanded regions for analysis; and the accumulation step obtains the cumulative video characteristic values by adding the video characteristic values calculated for the newly extracted regions to the cumulative video characteristic values obtained in the preceding scene change detection, wherein the entire expanded regions include the newly added regions and the regions which were previously used for the scene change, wherein the video characteristic values calculated in the video characteristic analysis step are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, a histogram accumulation process is carried out without carrying out the scene change detection step.

4. The scene change detection method of claim 3, further comprising a holding step of holding the obtained cumulative video characteristic values.

5. A scene change detection method that detects video scene changes, comprising:

a region extraction step of extracting subregions for analysis from two frames of video data;

a video characteristic analysis step of calculating video characteristic values for the video data in the entire subregions extracted by the region extraction step;

a step of calculating a difference value of the video characteristic values of the two frames in the subregions as calculated by the video characteristic analysis step;

a step of obtaining a cumulative difference value by cumulatively adding the calculated difference values; and an occurrence of a scene change detection step of detecting a scene change between the two frames, based on the obtained cumulative difference value; wherein when a scene change is detected to have occurred by the scene change detection step, a final judgment is made immediately that a scene change is present between said two frames; and wherein when no scene change is detected to occur by the scene change detection step, the region extraction step expands the regions for analysis by adding new regions extracted from regions that were not previously included in the regions for analysis, and the scene change detection step performs the detection of the scene change again, based on the cumulative difference value of the entire expanded regions for analysis; and the step of obtaining the cumulative difference value obtains the cumulative difference value by adding the difference value calculated for the newly extracted regions to the cumulative difference value obtained in the preceding scene change detection, wherein the entire expanded regions include the newly added regions and the regions which were previously used for the scene change, wherein the video characteristic values calculated in the video characteristic analysis step are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, said step of obtaining a cumulative difference value carries out a histogram accumulation process while the scene change detection step does not carry out a scene change detection process.

6. The scene change detection method of claim 5, further comprising a step of holding the obtained cumulative difference value.

7. A scene change detection method that detects scene changes in encoded video, comprising:

a region extraction step of extracting subregions for analysis from two encoded frames of video data;

a decoding step of decoding the encoded data of the subregions extracted by the region extraction step;

a video characteristic analysis step of calculating video characteristic values from the entire decoded data obtained by the decoding step;

an occurrence of a scene change detection step of detecting a scene change between the two frames, based on a difference in video characteristic values of the two frames; wherein when a scene change is detected to have occurred by the scene change detection step, a final judgment is made immediately that a scene change is present between said two frames; and wherein when no scene change is detected to occur by the scene change detection step, the region extraction step expands the regions for analysis by decoding the encoded data of new regions from regions that were not previously included in the regions for analysis and adding the decoded data to the decoded data of the regions already analyzed, and the scene change detection step performs the detection of the scene change again, based on the video characteristic values of the entire expanded regions for analysis, wherein the entire expanded regions include the newly added regions and the regions which were previously used for the scene change, wherein the video characteristic values calculated in the video characteristic analysis step are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, a histogram accumulation process is carried out without carrying out the scene change detection step.

8. A scene change detection method that detects scene changes in encoded video, comprising:

a region extraction step of extracting subregions for analysis from two encoded frames of video data;

a decoding step of decoding the encoded data of the subregions extracted by the region extraction step;

a video characteristic analysis step of calculating video characteristic values from the entire decoded data obtained by the decoding step;

an accumulation step of obtaining cumulative video characteristic values by cumulatively adding the video characteristic values calculated by the video characteristic analysis step; and an occurrence of a scene change detection step of detecting a scene change between the two frames, based on the cumulative video characteristic values of the two frames; wherein when a scene change is detected to have occurred by the scene change detection step, a final judgment is made immediately that a scene change is present between said two frames; and wherein when no scene change is detected to occur by the scene change detection step, the region extraction step expands the regions for analysis by adding new regions extracted from regions that were not previously included in the regions for analysis, and the scene change detection step performs the detection of the scene change again, based on the cumulative video values of the entire expanded regions for analysis; and the accumulation step obtains a new cumulative difference value by adding the difference value calculated for the newly extracted regions to the cumulative difference value obtained in the preceding scene change detection, wherein the entire expanded regions include the newly added regions and the regions which were previously used for the scene change, wherein the video characteristic values calculated in the video characteristic analysis step are histograms and the occurrence of a scene change is decided after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, a histogram accumulation process is carried out without carrying out the scene change detection step.

9. A scene change detection method that detects video scene changes, comprising:

a video recording step of saving video;

a step of managing recording positions of single-frame units or subregions thereof in video data saved by the video recording step;

a region extraction step of extracting parts of the video data of two frames as data of regions for analysis; and an occurrence of a scene change detection step of detecting a scene change between the two frames, based on a difference in video characteristic values in the data of the entire regions for analysis in the two frames extracted by the region extraction step; wherein when a scene change is detected to have occurred by the scene change detection step, a final judgment is made immediately that a scene change is present between said two frames; and wherein when it cannot be determined whether a scene change has occurred or not by the scene change detection step, the region extraction step expands the regions for analysis by adding part or all of the data of the parts of the video data that were not previously included in the regions for analysis; and the scene change detection step performs the detection of the scene change again on the entire expanded regions for analysis, wherein the entire expanded regions include the newly added regions and the regions which were previously used for the scene change, wherein the video characteristic values are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, a histogram accumulation process is carried out without carrying out the scene change detection step.

10. A scene change detection apparatus that detects video scene changes, comprising:

a region extraction unit configured to extract subregions for analysis from two frames of video data; and an occurrence of a scene change detection unit configured to detect a scene change between the two frames, based on a difference in video characteristic values in the entire subregions of the two frames extracted by the region extraction unit; wherein when a scene change is detected to have occurred by the scene change detection unit, a final judgment is made immediately that a scene change is present between said two frames; and wherein when no scene change is detected to occur by the scene change detection unit, the region extraction unit expands the regions for analysis by adding new regions extracted from regions that were not previously included in the regions for analysis, and the scene change detection unit performs the detection of the scene change again, based on image differences between the entire expanded regions for analysis, wherein the entire expanded regions include the newly added regions and the regions which were previously used for the scene change, wherein the video characteristic values are histograms and the occurrence of a scene change is detected by the scene change detection unit after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, an accumulation unit carries out a histogram accumulation process while the scene change detection unit does not carry out the scene change detection process.

11. The scene change detection apparatus of claim 10, further comprising a varying unit configured to vary a scene change decision threshold value in the scene change detection unit depending on an area or a position of the regions for analysis.

12. A scene change detection apparatus that detects video scene changes, comprising:

a region extraction unit configured to extract subregions for analysis from two frames of video data;

a video characteristic analysis unit configured to calculate video characteristic values for the video data in the entire subregions extracted by the region extraction unit;

an accumulation unit configured to obtain cumulative video characteristic values by cumulatively adding the video characteristic values calculated by the video characteristic analysis unit; and an occurrence of a scene change detection unit configured to detect a scene change between the two frames, based on the cumulative video characteristic values obtained for the two frames; wherein when a scene change is detected to have occurred by the scene change detection unit, a final judgment is made immediately that a scene change is present between said two frames; and wherein when no scene change is detected to occur by the scene change detection unit, the region extraction unit expands the regions for analysis by adding new regions extracted from regions that were not previously included in the regions for analysis, and the scene change detection unit performs the detection of the scene change again, based on the cumulative video characteristic values of the entire expanded regions for analysis; and the accumulation unit obtains the cumulative video characteristic values by adding the video characteristic values calculated for the newly extracted regions to the cumulative video characteristic values obtained in the preceding scene change detection, wherein the entire expanded regions include the newly added regions and the regions which were previously used for the scene change, wherein the video characteristic values calculated in the video characteristic analysis unit are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, said accumulation unit carries out a histogram accumulation process while the scene change detection unit does not carry out the scene change detection process.

13. The scene change detection apparatus of claim 12, further comprising a unit configured to hold the obtained cumulative video characteristic values.

14. A scene change detection apparatus that detects video scene changes, comprising:
a region extraction unit configured to extract subregions for analysis from two frames of video data;
a video characteristic analysis unit configured to calculate video characteristic values for the video data in the entire subregions extracted by the region extraction unit;
a unit configured to calculate a difference value of the video characteristic values of the two frames in the subregions as calculated by the video characteristic analysis unit;
a unit configured to obtain a cumulative difference value by cumulatively adding the calculated difference values; and
an occurrence of a scene change detection unit configured to detect a scene change between the two frames, based on the obtained cumulative difference value; wherein
when a scene change is detected to have occurred by the scene change detection unit, a final judgment is made immediately that a scene change is present between said two frames; and wherein
when no scene change is detected to occur by the scene change detection unit, the region extraction unit expands the regions for analysis by adding new regions extracted from regions that were not previously included in the regions for analysis, and the scene change detection unit performs the detection of the scene change again, based on the cumulative differences value of the entire expanded regions for analysis; and said unit configured to obtain the cumulative difference value obtains the cumulative difference value by adding the difference value calculated for the newly extracted regions to the cumulative difference value obtained in the preceding scene change detection, wherein the entire expanded regions include the newly added regions and the regions which were previously used for the scene change,
wherein the video characteristic values calculated in the video characteristic analysis unit are histograms and the occurrence of a scene change is detected after obtaining cumulative histograms by adding histograms of the newly added regions to the histograms accumulated so far, and wherein
when a judgment is made from the values of the cumulative histograms up to previous trial that whatever values the histograms of the newly added regions might take, they would not produce a scene change, said unit configured to obtain a cumulative difference value carries out a histogram accumulation process while the scene change detection unit does not carry out the scene change detection process.

15. The scene change detection apparatus of claim 14, further comprising a unit configured to hold the obtained cumulative difference value.

16. A scene change detection apparatus that detects scene changes in encoded video, comprising:
a region extraction unit configured to extract subregions for analysis from two encoded frames of video data;
a decoding unit configured to decode the encoded data of the subregions extracted by the region extraction unit;
a video characteristic analysis unit configured to calculate video characteristic values from the entire decoded data obtained by the decoding unit;
an occurrence of a scene change detection unit configured to detect a scene change between the two frames, based on a difference in video characteristic values of the two frames; wherein
when a scene change is detected to have occurred by the scene change detection unit, a final judgment is made immediately that a scene change is present between said two frames; and wherein
when no scene change is detected to occur by the scene change detection unit, the region extraction unit expands the regions for analysis by decoding the encoded data of new regions from regions that were not previously included in the regions for analysis and adding the decoded data to the decoded data of the regions already analyzed, and the scene change detection unit performs the detection of the scene change again, based on the video characteristic values of the entire expanded regions for analysis, wherein the entire expanded regions include the newly added regions and the regions which were previously used for the scene change,
wherein the video characteristic values calculated in the video characteristic analysis unit are histograms and the occurrence of a scene change is detected after obtaining cumulative histograms by adding histograms of the newly added regions to the histograms accumulated so far, and wherein
when a judgment is made from the values of the cumulative histograms up to previous trial that whatever values the histograms of the newly added regions might take, they would not produce a scene change, an accumulation unit carries out a histogram accumulation process while the scene change detection unit does not carry out the scene change detection process.

17. A scene change detection apparatus that detects scene changes in encoded video, comprising:
a region extraction unit configured to extract subregions for analysis from two encoded frames of video data;
a decoding unit configured to decode the encoded data of the subregions extracted by the region extraction unit;
a video characteristic analysis unit configured to calculate video characteristic values from the entire decoded data obtained by the decoding unit;
an accumulation unit configured to obtain cumulative video characteristic values by cumulatively adding the video characteristic values calculated by the video characteristic analysis unit; and
an occurrence of a scene change detection unit configured to detect a scene change between the two frames, based on the cumulative video characteristic values of the two frames; wherein when a scene change is detected to have occurred by the scene change detection unit, a final judgment is made immediately that a scene change is present between said two frames; and wherein when no scene change is detected to occur by the scene change detection unit, the region extraction unit expands the regions for analysis by adding new regions extracted from regions that were not previously included in the regions for analysis, and the scene change detection unit performs the detection of the scene change again, based on the cumulative video values of the entire expanded regions for analysis; and the accumulation unit obtains a new cumulative difference value by adding the difference value calculated for the newly extracted regions to the cumulative difference value obtained in the preceding scene change detection, wherein the entire expanded regions include the newly added regions and the regions which were previously used for the scene change, wherein the video characteristic values calculated in the video characteristic analysis unit are histograms and the occurrence of a scene change is detected after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, said accumulation unit carries out a histogram accumulation process while the scene change detection unit does not carry out the scene change detection process.

18. A scene change detection apparatus that detects video scene changes, comprising:
 a video recording unit configured to save video;
 a unit configured to manage recording positions of single-frame units or subregions thereof in video data saved by the video recording unit;
 a region extraction unit configured to extract parts of the image data of two frames as data of regions for analysis; and
 an occurrence of a scene change detection unit configured to detect a scene change between the two frames, based on a difference in video characteristic values in the data of the entire regions for analysis extracted by the region extraction unit; wherein when a scene change is detected to have occurred by the scene change detection unit, a final judgment is made immediately that a scene change is present between said two frames; and wherein when it cannot be determined whether a scene change has occurred or not by the scene change detection unit, the region extraction unit expands the regions for analysis by extracting and adding part or all of the data of the parts of the video data that were not previously included in the regions for analysis; and the scene change detection unit performs the detection of the scene change again on the entire expanded regions for analysis, wherein the entire expanded regions include the newly added regions and the regions which were previously used for the scene change, wherein the video characteristic values are histograms and the occurrence of a scene change is decided after obtaining cumulative histograms by adding histograms of the newly added regions to the histograms accumulated so far, and wherein when a judgment is made from the values of the cumulative histograms up to previous trial that whatever values the histograms of the newly added regions might take, they would not produce a scene change, an accumulation unit carries out a histogram accumulation process while the scene change detection unit does not carry out the scene change detection process.

* * * * *